United States Patent
Speks et al.

(10) Patent No.: US 9,198,111 B2
(45) Date of Patent: *Nov. 24, 2015

(54) RESOURCE POOLING IN A BLADE CLUSTER SWITCHING CENTER SERVER

(71) Applicant: Telefonaktiebolaget LM Ericsson (publ), Stockholm (SE)

(72) Inventors: Oliver Speks, Eschweiler (DE); Jacky Wu, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 3 days.

This patent is subject to a terminal disclaimer.

(21) Appl. No.: 14/146,756

(22) Filed: Jan. 3, 2014

(65) Prior Publication Data

US 2014/0119171 A1 May 1, 2014

Related U.S. Application Data

(63) Continuation of application No. 12/993,589, filed as application No. PCT/EP2008/004076 on May 21, 2008, now Pat. No. 8,654,762.

(51) Int. Cl.
| | |
|---|---|
| *H04L 12/50* | (2006.01) |
| *H04W 40/24* | (2009.01) |
| *G06F 11/20* | (2006.01) |
| *H04L 5/00* | (2006.01) |

(52) U.S. Cl.
CPC ........... *H04W 40/24* (2013.01); *G06F 11/2028* (2013.01); *G06F 11/2033* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 8,214,479 | B2 | 7/2012 | Luessem et al. |
| 2002/0187790 | A1 | 12/2002 | Papadimitriou et al. |
| 2005/0015430 | A1 | 1/2005 | Rothman et al. |
| 2007/0061433 | A1 | 3/2007 | Reynolds et al. |
| 2011/0060824 | A1 | 3/2011 | Lundstrom et al. |

FOREIGN PATENT DOCUMENTS

WO      2005006186 A1    1/2005

OTHER PUBLICATIONS

Tsugeya, New Management Technologies for Blade Servers, Fujitsu Sci. Tech. J., 10 pages, Jun. 2004.*
Maekiniemi, P. "Ericsson MSC Server Blade Cluster", Evolving the MSC Server Architecture, Ericsson Review 10, Mar. 1, 2008, pp. 1-4.

* cited by examiner

*Primary Examiner* — Frank Duong
(74) *Attorney, Agent, or Firm* — Coats & Bennett, PLLC

(57) ABSTRACT

The present invention relates to a switching center server comprising:
  a blade cluster with a plurality of blades,
  a plurality of pooled resources accessible by said plurality of blades for handling a call, and
  a master provided on one of the blades centrally coordinating the usage of the pooled resources, the master as a central instance being responsible for allocation, de-allocation and maintenance of the pooled resources. At outage of one or more blades, the invention provides mechanisms to keep impacts on ongoing calls to a minimum and to keep pooled resources available to the remaining blades.

32 Claims, 19 Drawing Sheets

RESOURCE POOLING IN A BLADE CLUSTER SWITCHING CENTER SERVER

RELATED APPLICATIONS

The present Application is a continuation of U.S. patent application Ser. No. 12/993,589, which was filed on Feb. 8, 2011, which is a national stage application of PCT/EP2008/004076, filed May 21, 2008, the disclosures of each of which are incorporated herein by reference in their entirety.

TECHNICAL FIELD

This invention relates to a switching center server handling calls. The invention relates especially, but not exclusively, to a mobile service switching center server (MSC-S).

BACKGROUND

A typical architecture for an existing high capacity MSC server is a server structure having a blade cluster structure with a plurality of blades. Transmission lines that carry payload are terminated in media gateways (MGw). The switching of these resources is controlled by the MSC server (MSC-S).

Time division multiplex terminations (TDM terminations) as they are used in contemporary telecommunication systems are not well-suited to be controlled by a blade cluster server because neither the call control signaling nor the media gateway control signaling provides support for a multi-blade architecture. Before a resource such as a termination can be used for a call, coordination of exclusive usage must be performed between the different blades of the switching center server. Furthermore, signaling messages need to be routed to the blade that handles the respective call.

Ephemeral terminations are better suited for a multi-blade architecture. The seizure of termination is coordinated by the media gateway. There is no need for inter-blade coordination on the MSC server side. Signaling messages need to be routed to the blade that handles the respective call. BICC (bearer independent call control) uses ephemeral terminations but requires coordination of call instance codes (CIC) on the MSC server side since they are a common resource of all blades.

With the above-described technology, it is difficult to share TDM terminations and CICs amongst several blades. The range of available TDM circuits and for BICC the range of call instance codes has to be partitioned. In this case, each partition is administratively assigned to a particular MSC server blade.

However, the partitioning of resources has the drawback that the partitioning inhibits the efficient use of user plane circuits. If a blade fails, the resources that are dedicated to a failing blade are unavailable for other traffic. Furthermore, it is more difficult to configure the MSC server compared to a system that does not need to partition the TDM circuits. Especially when blades are added or removed from the cluster, re-partitioning of the resources assigned to the other blades needs to be performed. The number of blades in active state can change for example due to outage of individual blades or in case the server performance is increased by adding new blades. If the number of circuits to be partitioned is only little higher than the number of blades, even distribution of connectivity to the blades becomes difficult. If there are fewer circuits to be partitioned than there are blades in the cluster, connectivity cannot be provided to all blades.

SUMMARY

In view of the above-discussed drawbacks, a need exists to provide a switching center server having a blade structure that allows an efficient use of resources such as user plane circuits and a simplified adaption to changes in the number of blades present in the server, both from capital expenditure as well as operational expenditure point of view This need is met by the features of the independent claims. In the dependent claims, preferred embodiments of the invention are described.

According to one aspect of the invention a switching center server is provided comprising a blade cluster with a plurality of blades. Furthermore, a plurality of resource pools is provided accessible by said plurality of blades for handling a call. In addition, for each resource pool a dedicated master is provided on one of the blades centrally coordinating the usage of the pooled resources. The above-described switching center server is advantageous as it allows a scalable set of blades in a blade cluster server to share resource pools. Sharing is performed without partitioning and with a single instance, i.e. the master, for the pooled resources responsible for the usage of the resources, e.g. allocation, de-allocation and maintenance.

The set of circuits, channels, and user plane terminations are examples for pooled resources that should be accessible for call handling on any blade. The switching center server of the invention avoids the dedication of subsets of these resources to individual blades by having the master coordinating the usage of the pooled resources performed centrally.

For trunks a route master may be provided for each set of circuits that have the same properties. TDM terminations have a fixed administered relationship to a CIC. Each route has a master instance coordinating selection and release of CICs that are connected to the route. The master considers selection types that are applicable for the route in question. Coordination of maintenance procedure comprising handling of maintenance massages is performed by the route master.

An access master may be provided for each ISDN access. For IDSN access TDM terminations have a fixed administered relationship to a channel. Each primary rate access has a master coordinating selection and release of connected channels. This master, called the access master, considers hunting types that are applicable for the access in question. The coordination of maintenance procedures comprising handling of maintenance messages are performed by the access master. Accordingly, for each route or each access a master instance may be provided, each master instance controlling a pool of shared resources.

According to one embodiment of the invention, a call controller is furthermore provided on one of the blades controlling the resources for the duration of the call. During the duration of a call the used terminations in the media gateway may be controlled by the blade on which the call controller is provided. The call controller may request control over resources from the route/access master and may return the control over resources to said master if the resources are not needed anymore. Maintenance procedures such as a status change and auditing may be coordinated on a media gateway level by a media gateway master.

A blade and a blade cluster can fail due to hardware or software faults. Failure means that the blade is no longer available for call processing and maintenance handling. These faults can be of temporary or permanent nature. The invention provides high retainability, meaning that calls remain intact to the greatest extent possible. Failure of the blade hosting the master function for any resource used for a call does not affect established calls.

Preferably the blade cluster is designed in such a way that the information about the used resources for a call is kept on two different blades. By keeping the information redundant on two different blades at a time the following advantages are achieved. A first advantage is the availability aspect meaning that the pooled resources remain available to the remaining blades in the cluster even when the blade that hosts the master performs a recovery action that can retain calls fulfilling certain stability criteria. Another advantage is the integrity aspect meaning that a failure of an individual blade is hidden from other nodes in the network except for release of resources due to disconnection of calls that were controlled by the failed blade. There is no mass resetting of unused resources at single blade failure.

The call controller maintains the information about the used resources for the call. The master instance as primary source additionally knows which resources are used by any blade. In case the master and the call controller are provided on two different blades, the information about the used resources is provided on two different blades. If the master and the call controller reside on the same blade, a buddy is used on another blade, the buddy containing information about the resources used by the master.

According to another aspect of the invention, a blade status information unit is provided determining the status of the different blades. This blade status information unit informs at a status change of one blade the other blades of said status change. This blade status information unit can be designed in such a way that a blade status information unit is provided on each blade, the different blade status information units of the different blades being interconnected and exchanging information about the status changes of each blade.

Furthermore, a group communication service unit may be provided controlling the delivery of messages between blades in such a way that messages are delivered in the same order to the plurality of blades. Users on one blade that receive a message can be sure that the message is delivered to users on all other blades that are part of the quorum as well. Additionally, each blade is aware which other blades are part of the quorum.

As indicated above, a blade of the cluster can fail due to hardware or software faults. Accordingly, a master provided on a failing blade may be lost. A master present on a failing blade loses the master role. For the creation of a new master a coordinator may be provided creating the new master replacing the master present on a failed blade. Preferably the coordinator additionally decides on which blade to allocate the new master. The coordinator may additionally create a new buddy replacing a buddy present on a failed blade, the coordinator additionally deciding on which blade to allocate the new buddy. Preferably the coordinator takes into account the computing load of the different blades for the allocation of a new master or a new buddy. Thus, an adequate distribution of the computing load between the different blades can be achieved.

In order to recover a failing blade, a blade recovery unit may be provided on each blade carrying out a recovery procedure in case of a blade failure. Dependent on the recovery mechanism applied by a failing blade, calls that are controlled by a temporarily failing blade may be retained. The blade recovery unit can decide which of the calls handled by the failing blade to retain and which of the calls not to retain and transmits at the end of the recovery procedure information about the resources used for retained calls and the resources of which control is returned to the master. The not retained calls are disconnected and related resources are released by the master upon reception of said information from the failing blade. For the blade recovery, configuration data may be kept on all different blades. It is therefore robust against multi-blade failures. Should a blade lose memory in a failure situation, the blade recovery unit copies the data necessary from a blade that is intact.

The invention furthermore relates to a method for controlling a switching center server comprising the steps of providing pooled resources accessible to said plurality of blades and comprising the step of coordinating usage of the pooled resources for said call by said plurality of blades by the master. For the duration of a call, the call control is handled by a call controller which sets up the call, supervises the call, disconnects the call, requests control over resources from the route/access master and returns the control to said master if resources are not needed anymore. Accordingly, the information about the used resources is present on the blades where the call controller and the master reside on. Preferably, the resource information is generally controlled in such a way that the information about the used resources is present on more than one blade.

In an additional step the status of the blades is detected wherein in case of a status change of one blade the other blades are informed of the status change of said one blade. By detecting the status change of a blade, a blade failure is detected. In an additional step it may be detected whether a recovery procedure is carried out for said blade. If this is not the case all resources controlled by said failed blade can be released to be used for other calls. The resources of the failed blade are reset. In case a single blade fails, a copy of all information is present on another blade. In case a recovery procedure is carried out on the failed blade, the master is informed about the resources used for calls that are not retained after the recovery procedure so that the master can then reset the resources of the not retained calls. When the master receives information which CICs/channels are no longer used from blades that have carried out a blade recovery, the master then resets those CICs/channels that are no longer used and may send GCP (Gateway Control Protocol) subtract commands to the media gateway concerning the related TDM and ephemeral terminations.

When no calls of the failing blade are retained, the CICs/channels and connected TDM terminations that have been used by the failed blade are reset by the master, ephemeral terminations are subtracted by the media gateway master using the wildcarding mechanism.

When it is detected that a master was present on a failed blade, a new master is created and a first list of resources used by each blade is transmitted from each other blade to the new master. It may now happen that the master and the call controller for a call reside on the same blade. In this case the buddy is informed about state changes such as busy condition of the CICs or channels due to regular traffic handling. Accordingly, in case the master blade and the call controller blade are identical, the buddy contains the information which resources the master had used. Consequently, in case call controller and master are present on the same failing blade, the buddy, respectively the blade on which the buddy is provided, transmits a second list of used resources used by the call controller of the failed blade to the new master. If the failing blade does not perform a recovery action with call retaining, the new master can reset all resources that are present on the second list and re-use them immediately.

Each blade receives notification about state changes of the other blades in the cluster. The master and the buddy roles that were assigned to the failing blade are now assigned to different blades. Each blade sends a list of CICs/channels that it has leased to the new master. The blade that so far hosted the buddy of the master on the failed blade additionally sends the second list of CICs/channels that the master on the failing blade had leased to the call controller collocated on the same blade. A new buddy may be created for each of the new masters and be updated with the busy data of the resources that are currently leased by users on the blade the new master resides on as well as the data received from the previous buddy. The new master and the media gateway master may then perform resetting of devices and terminations as described above.

In case the buddy is present on a failed blade, the master being alive, a new buddy is created and the current master sends a copy of the list of CICs/channels that are controlled by its own blade to the new buddy. There is no impact on traffic handling or maintenance activities.

Should the master and one more blade fail at the same time, each of the remaining blades sends to the new master a list of CICs/channels that it has leased. The new master has no information which circuits have been leased by call controllers on the two failing blades. If none of the failing blades performs a recovery action with call retaining, the new master resets all CICs/channels that are not present on any list received from the remaining blades and can re-use them immediately.

As mentioned above, calls may be retained at blade failure. In case of such blade recovery the no longer used circuits are eventually reset by the master. A recovering blade transmits lists of still used and no longer used resources to the master only after finishing the recovering procedure. Until reception of these lists, the master cannot reset the resources used by the failed blade as it is not known which calls will possibly be retained the recovery procedure on the failed blade. Upon reception of said list containing CICs/channels that are no longer used, the master resets the CICs/channels contained in that list and can re-use them.

If one blade performs recovery procedure of the kind with call retaining, and it was hosting a master, then a new master is immediately assigned on a different blade. Each of the remaining blades sends to the new master a list of CICs/channels that it has leased. The buddy now has the information which circuits the call controller of the failing blade had used. Through the fact that the buddy additionally transmits the second list of resources used by the call controller on the failing blade that hosted the master, the new master then knows which resources are currently used and which resources are not used. The new master can immediately re-use resources that are not contained on any of said lists received from other blades and that are not used by a call controller co-located on the same blade, since the new master knows that these resources are currently not in use. The new master will treat resources leased by the failing blade as used until it receives the list of no-longer used resources from that blade when it finishes the recovery. Upon reception of said list containing CICs/channels that are no longer used, the master resets the CICs/channels contained in that list and can re-use them.

If the blade, which performs recovery procedure of the kind with call retaining, was hosting a master, and if the buddy were not present, then the new master could during the entire duration of the recovery procedure of the failed blade not lease out any resources that are not included in the lists from the remaining blades. The reason is that the new master would not know which of the non-reported CICs/channels have been leased by the recovering blade and which CICs/channels have been idle. In this situation the master would be limited to the presently used resources which become available after a call has been released. For these resources the master definitely knows that the released resources can be used for other calls. This would reduce the number of resources available in the pool and increase blocking probability, especially when the pool usage level is low at the time of the failure event.

The information of the buddy helps to avoid the limitation of the available pooled resources, as the new master receives the information which resources were used by the failing blade. The new master can reset all resources not used by other blades, except for the resources used by the failing blade, as some of the resources may be used by retained calls. After the recovery procedure the new master is informed about the retained and not retained calls. The new master can then reset all no longer used resources of said blade.

In case only one blade is in active state, buddies on other blades cannot be created. Accordingly, when it is detected that more than one blade is in active state, a buddy can be created for the master on another blade.

When a new master has to be created for a master present on a failing blade, the following steps may be carried out: first of all, it may be determined by the coordinator on which blade to create the new master. In a next step, the coordinator may inform the other blades of the creation of the new master. The new master may then build a status table of resources used by each blade so that the other blades can now transmit the information to the new master needed by the new master for coordinating the usage of the pooled resources by the plurality of blades. The master may then provide a copy of the data related to call control performed by the own blade to the buddy, the buddy informing the master when it has received and successfully stored the data. Finally, the new master informs the other blades of the completion of the creation of the master.

For computing resource reasons it may be necessary to move the master and/or the buddy to other blades.

For the move of a buddy the same steps are carried out as for the creation of a buddy. The move of a buddy may comprise the following steps. In a first step the coordinator determines which buddy should be moved and to which blade the buddy should be moved. In a next step the master transmits all data needed by the new buddy to the new buddy, and the new buddy informs the other blades of the successful completion of the move.

Additionally, it may be necessary to move the coordinator. According to one aspect of the invention, the coordinator is provided on the blade with the smallest age rank meaning which is in active state for the longest time. Preferably, a move of the coordinator controlling the move or the creation of a new master does not influence the move or creation of the new master.

In case seizure requests for resources are received during move of a master, these seizure requests are buffered and, after completion of the transfer, are transmitted to the new master. In case a failure is detected for the new master before the completion of the transfer, the move is aborted.

In order to assure that, when a new blade is added to the blade cluster the newly added blade is coordinated with the other blades the current status and the allocation of masters and buddies are transmitted from another blade to the new active blade.

BRIEF DESCRIPTION OF THE DRAWINGS

In the following, the invention will be described with reference to the accompanying drawings, in which.

DETAILED DESCRIPTION

Figure 1:
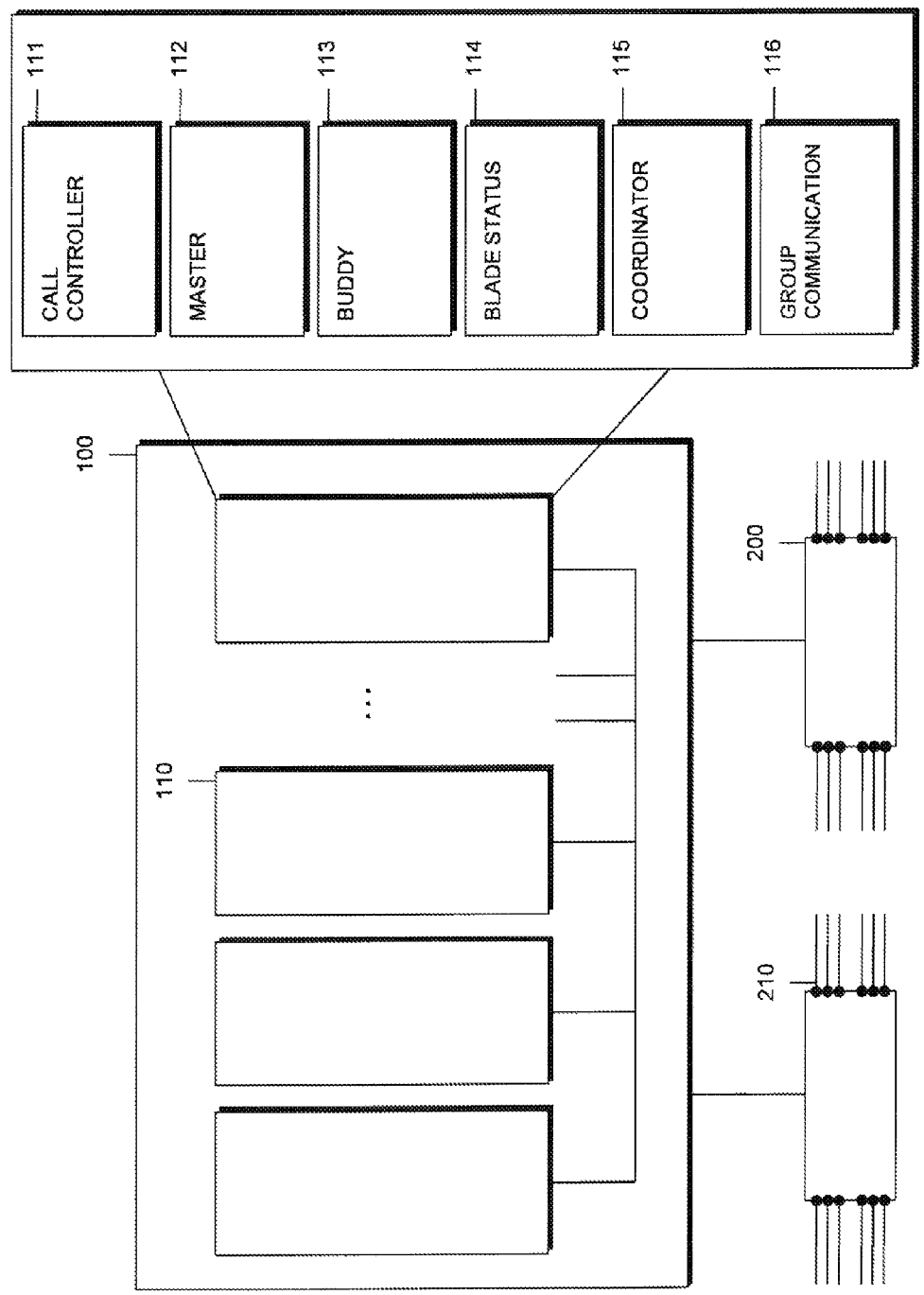
FIG. 1 shows a switching center server with a blade cluster structure essentially coordinating the usage of resources by a master, FIGS. 2a and b show an example of a blade cluster with three blades and the allocation of call control and master.

In FIG. 1 an exemplary embodiment of a mobile service switching server (MSC server) 100 having a cluster structure with a plurality of blades 110 is shown. For handling calls, the mobile switching center 100 is connected to media gateways (MGw) 200. Each MGw comprises a plurality of terminations 210. As known in the art, a MGw acts as a translation unit between separate telecommunication networks the MGws enabling multimedia communications over multiple transport protocols. The resources such as the user plane terminations 210 or the set of circuits or channels are examples for pooled resources that should be accessible by all blades 110. The coordination of usage of the pooled resources is performed by a master 112 as shown in the right part of FIG. 1, where some of the modules provided on a blade are shown in an exemplary embodiment. For trunks, the master is a route master coordinating the selection and release of CICs that are connected to the route. For each route, a route master is provided, each master coordinating a pool of pooled resources. In other words, each pool of shared resources is controlled by the dedicated master. For ISDN access, the master is the access master coordinating selection and release of channels that are connected to an access. Furthermore, a call controller 111 is provided controlling the individual resources during a call, i.e. sets up the call, supervises the call and disconnects the call. Additionally, a blade status determination unit is provided on each blade communicating with the blade status determination units on other blades in order to inform the other blades of a status change, e.g. in case of a failure of a blade.

Additionally, a coordinator 115 may be provided on a blade deciding which blades shall host the master 112 or a buddy 113. As will be explained in detail further below, the buddy 113 is provided in case the master 112 and the call controller 111 for a certain call are provided on the same blade. Additionally, a group communication service unit 116 is provided controlling the delivery of messages between the different blades in such a way that messages are delivered in the same order to all blades. Furthermore, a blade recovery unit (not shown) is provided initiating a blade recovery procedure in case of a failure of a blade. Maintenance procedures on media gateway level are coordinated by a media gateway master not shown in the embodiment of FIG. 1.

It is now possible that the blade 110 of the cluster fails due to hardware or software faults. The blade recovery unit carries out a blade recovery procedure which is performed on route and PRA level. In the following, when reference is made to all calls or all devices, then this refers to all calls that are carried by the route or PRA and all devices connected to the route or PRA.

Blade Configuration Change and Failure Recovery

Recovery Preparation

The recovery principle is to restore all functionality that the affected blade was offering to other blades as soon as possible on a different blade and not to wait for the affected blade to recover. Recovery preparation helps to keep the transition time of such functionality to other blades short.

Every route/PRA master has a buddy. In order to reduce inter blade communication, the buddy, i.e. the buddy blade, is not informed about state changes (busy condition) of the CICs or channels due to regular traffic handling, except for calls where route/PRA master blade and call controlling blade are identical. For the latter case, the busy state information is stored additionally on the buddy blade and the CIC is not leased to call control until the busy condition is successfully stored by the buddy. This way, traffic related (busy) state information is at any time available at the call controlling blade and one more blade.

Figure 2A:
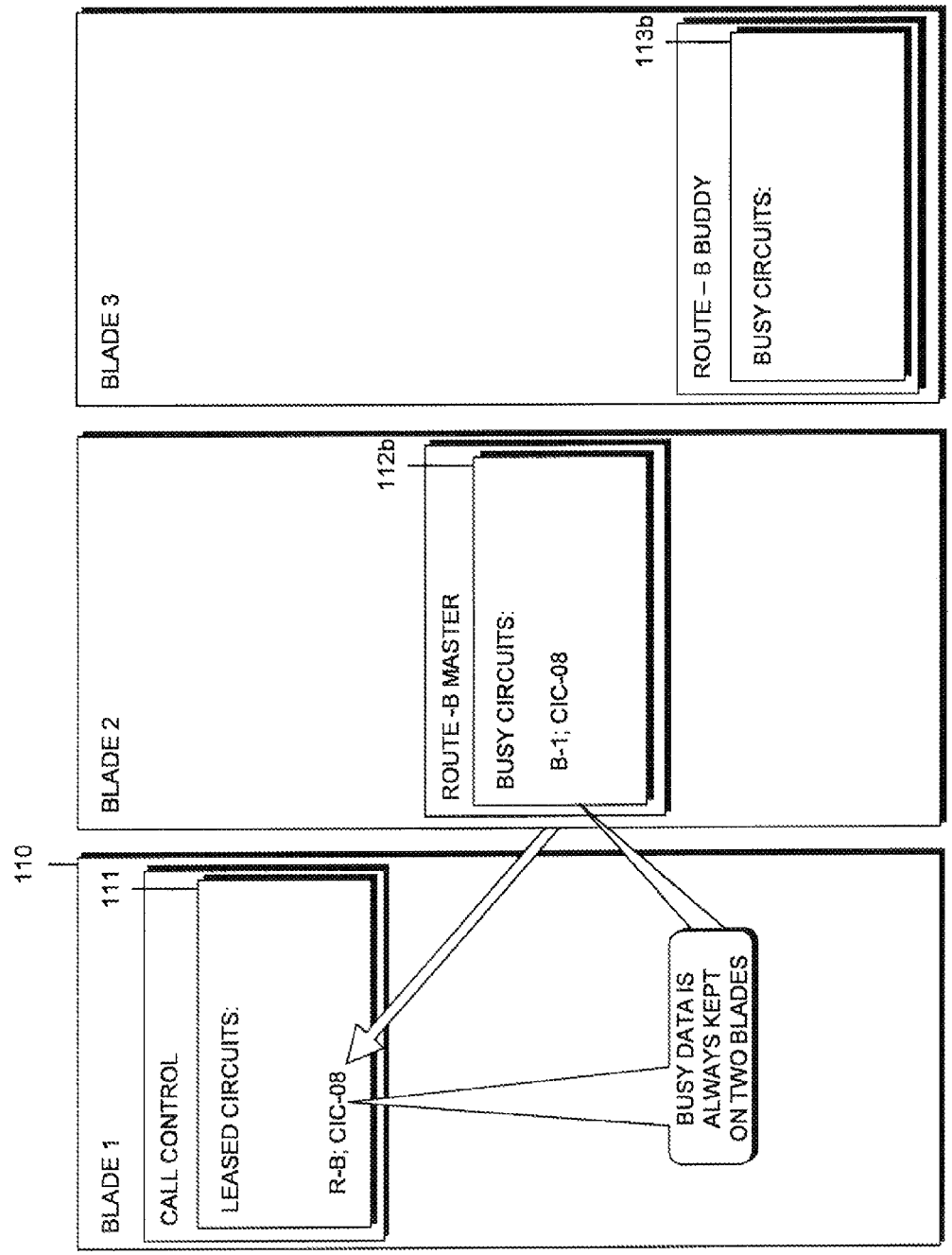

FIG. 2a illustrates by means of an example, which information is stored by the master 112b, the buddy 113b and the call controller 111. On blade 1, the call controller 111 has the entry "R-B; CIC-08", which means that CIC 08 of route B has been leased. First entry in the list of busy circuits of route master B 112b is "B-1; CIC-08". This means that CIC number 08 has been leased to a call controller 111 on blade 1. Since master 112b and call controller 111 do not reside on the same blade, there is no corresponding entry in the route buddy 113b on blade 3.

Figure 2B:
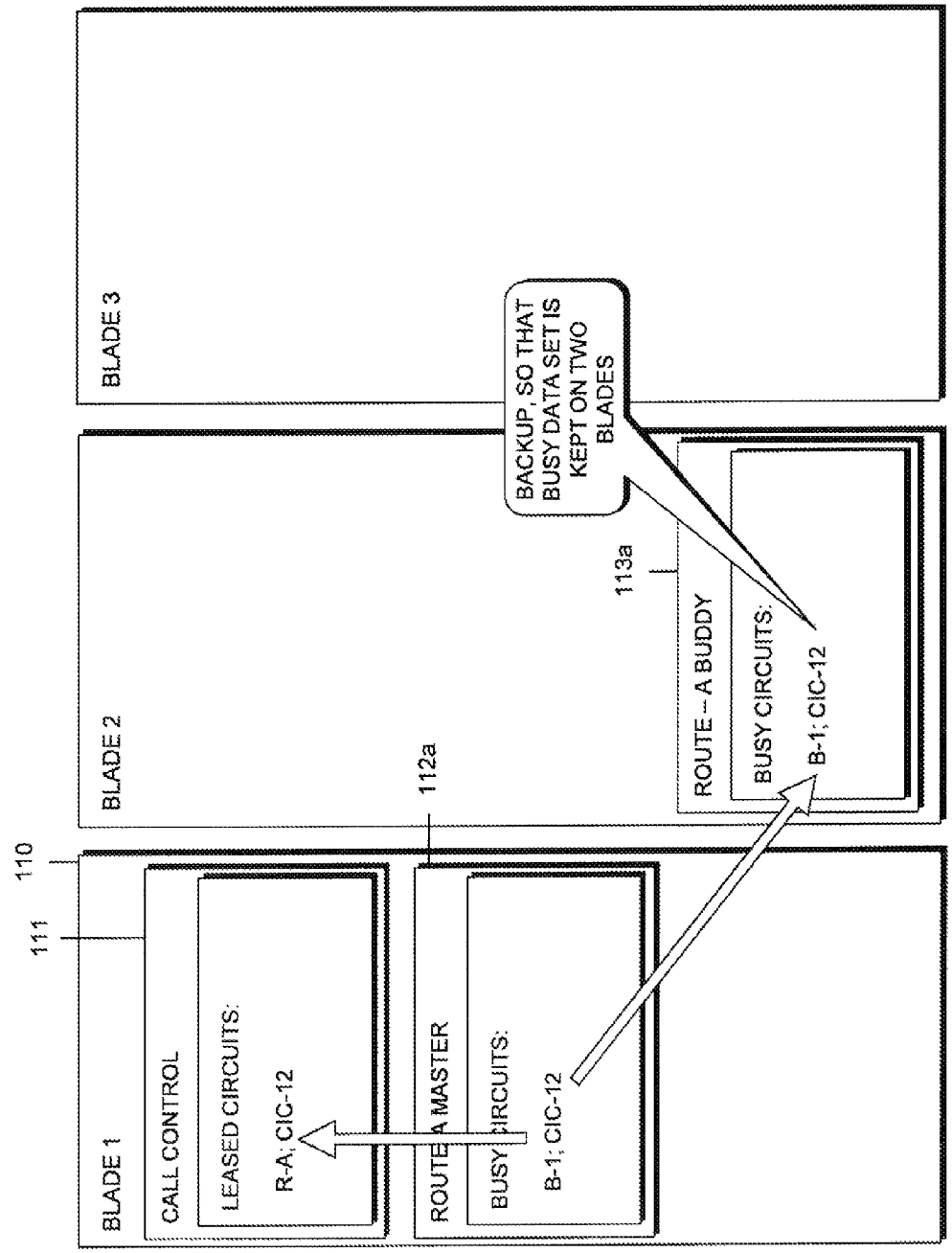

FIG. 2b shows an example of a case where master 112a and call controller 111 reside on the same blade. On blade 1, the call controller 111 has the entry "R-A; CIC-12", which means that CIC 12 of route A has been leased. First entry in the list of busy circuits of route master A 112a is "B-1; CIC-12". This means that CIC number 12 has been leased to a call controller on blade 1. Since master 112a and call controller 111 reside on the same blade, the information that CIC 12 has been used to a call controller on blade 1 is also stored by the buddy 113a that resides on blade 2.

Figure 3:
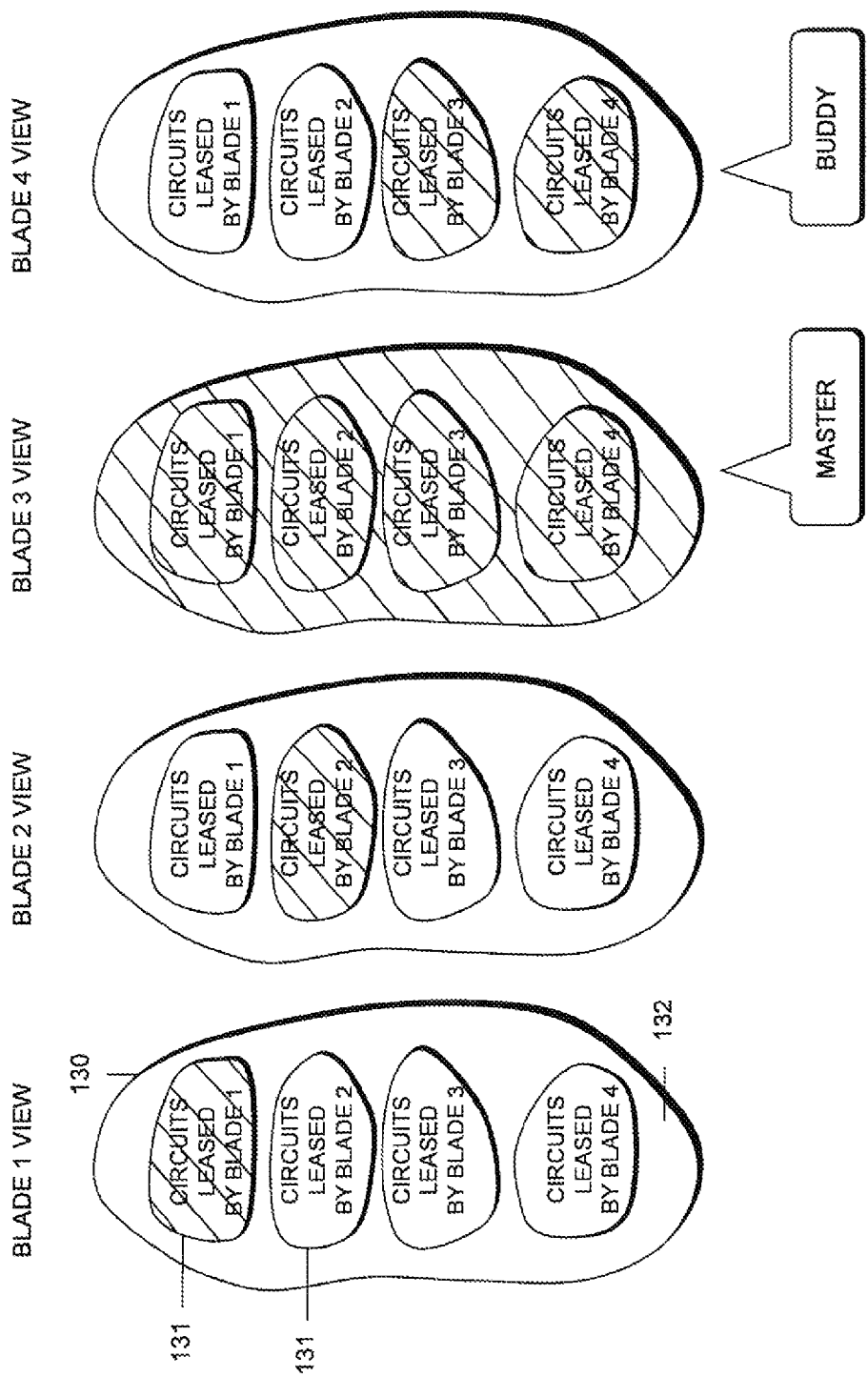
FIG. 3 shows a blade structure giving an overview over the resource information provided on the different blades.

In FIG. 3 the knowledge of the different blades about the circuits belonging to one route is summarized. FIG. 3 shows for each blade the hedged areas indicating the sets of circuits the blade knows the status of. The large area 130 represents the total number of circuits available for said route. The smaller areas 131 represent the leased circuits by each blade. The area 132 representing the difference of areas 130 and 131 represents the idle circuits for said route. In the embodiment shown four different blades are provided. Blade 1 knows which circuits are leased by blade 1, whereas blade 2 knows the circuits leased by blade 2. In the embodiment shown blade 3 comprises the route master knowing which circuits are used by the different blades for that predetermined route. The master provided on blade 3 has information about the circuits leased by blade 1, by blade 2, by blade 3, by blade 4 and the idle circuits not leased to any call controller. As can be seen, the master also knows the status of the unused circuits. In the embodiment shown the buddy is contained on blade 4. As a consequence, the buddy blade does not only know which circuits are leased by blade 4. Blade 4 in its buddy role additionally has the knowledge about the circuits leased by blade 3 in case the call controller for a call is also provided on blade 3 where the master is provided. For each call a call controller is provided, and these call controllers are distributed over the blades. In case the call controller for a call using a certain route is provided on the same blade as the master for said route, the buddy additionally contains the information which circuits are leased by the blade where the master is provided.

MGw masters have no buddy. MGw status information is replicated on all blades. In the following a table is shown indicating how the call-related information is distributed.

| Information | Primary | Secondary | Alternative |
| --- | --- | --- | --- |
| Route device busy condition | Route Master | Call controller | Route Buddy |
| PRA device busy condition | PRA master | Call controller | PRA Buddy |
| Route device line blocking condition | Route master | | Every blade |
| Route device other blocking condition | Route master | | Every blade |
| Maintenance message activities and alarms | Master | | Every blade |
| MGw status | MGw master | | Every blade |
| Termination audit activities | MGw master | | Every blade |

Primary storage is the place that keeps the information during normal operation and is used for reference. Secondary storage is the place that keeps the information during normal operation for backup purposes. If the primary storage is not available, then the backup storage is used to restore the information in the primary storage. Alternative backup is the storage location that is used instead of the secondary storage location if the primary and secondary storage would otherwise be located on the same blade.

Different to what is described above, redundancy cannot be provided if there is only one blade handling traffic. In this scenario, there are no buddies. As soon as one more blade is handing traffic, buddies are created. Re-balancing will make sure that masters are evenly distributed when two or more blades are in traffic mode.

Figure 4:
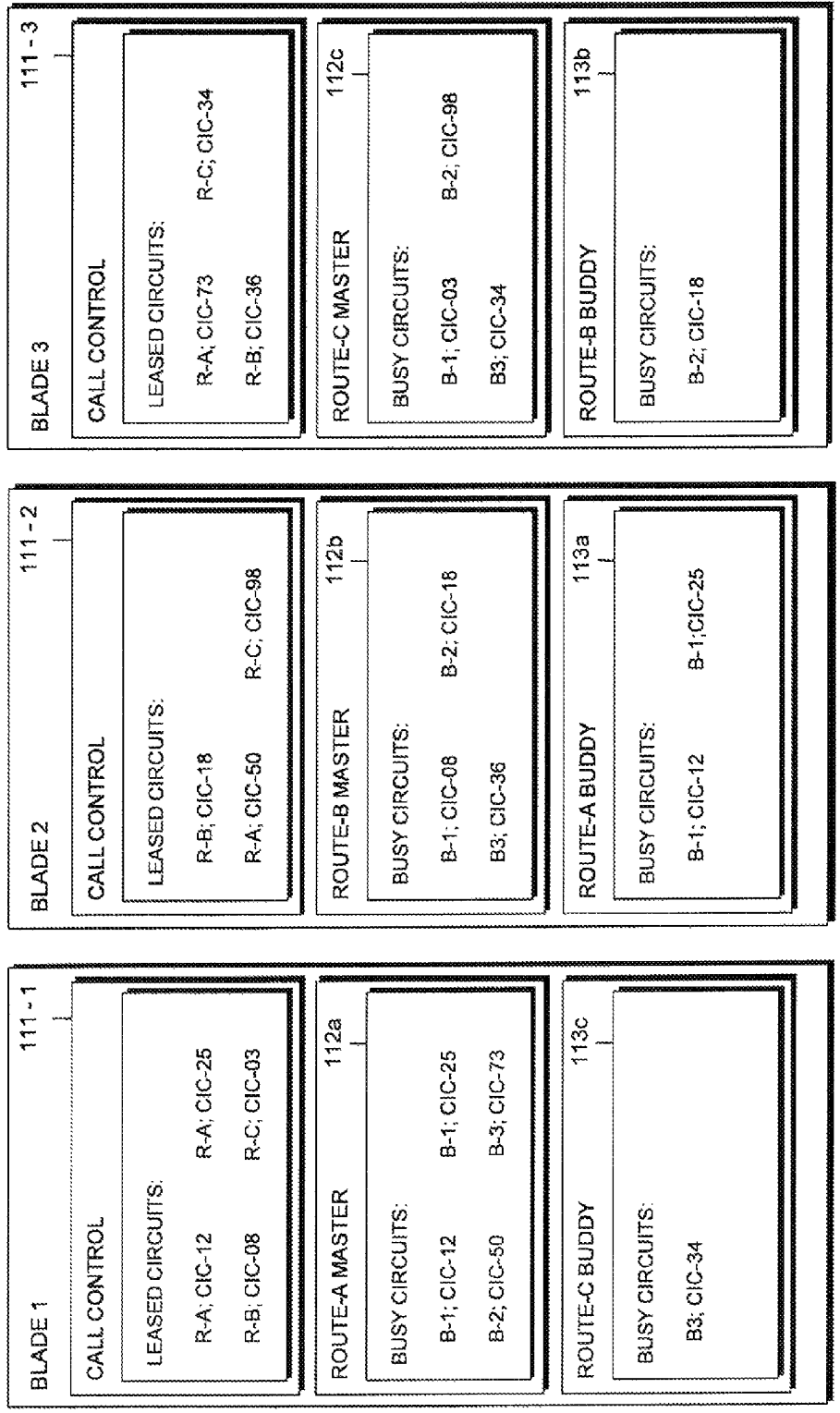
FIG. 4 shows a blade structure with three blades and different permutations of three routes and usage of resources.

In FIG. 4, examples show which information is stored by the master, the buddy and the call controller. First entry in the list of busy circuits of route master A 112*a* is "B-1; CIC-12". This means that CIC number 12 has been leased to a call controller on blade 1. On the same blade, the call controller has the entry "R-A; CIC-12", which means that the same CIC of route A has been leased. Since master 112*a* and call controller 111 reside on the same blade, the route A buddy 113*a* on blade 2 has also an entry: "B-1; CIC-12", indicating that CIC-12 has been leased to call controller on blade 1.

In the example shown in FIG. 4, the call controller 111-1 on blade 1 has additionally leased circuit 25 for route A. As the route master 112*a* containing the information about the busy circuit 25 is also contained on blade 1 to route A, buddy 113*a* additionally has the entry of the busy circuit CIC-25 used by blade 1. The route C buddy 113*c* has the entry that on blade 3 the circuit 34 is busy, as the call controller for circuit 34 and the route C master 112*c* are both provided on the same blade, namely blade 3. The same is true for the route B buddy 113*b* containing the information that on blade 2 the circuit 18 is busy for route B, the information that is otherwise provided on blade 2 in the call controller 111-2 and the route B master 112*b*. In the other examples shown, the information about leased circuits and busy circuits is provided on two different blades so that additional information in the buddy is not needed.

Recovery at Blade Failure

As soon as a blade leaves the active state, any master and buddy roles it had are lost. Replacements must be established for the roles of master and buddy.

The handling of resources leased by the failing blade is different dependent on if it is performing a recovery procedure with call retaining or without call retaining. The other blades are informed if call that are controlled by the failing blade may be retained.

Actions Performed by the Other Blades at Single Blade Failure

Resetting of Devices and Terminations

Blade Recovery with Loss of Ongoing Calls:

The route master knows which CICs and the PRA master knows which channels are used by the failed blade. As soon as it is known that a blade has failed and it does not perform recovery with call retaining, the CICs/channels and connected TDM terminations that have been used by a failed blade are reset by the (new) route/PRA master. Ephemeral terminations are subtracted by the MGw master using the wildcarding mechanism identifying terminations used by the recovering blade.

Blade Recovery Allowing Call Retaining:

The master receives information from the recovering blade about which CICs/channels are still used and which CICs/channels are no longer used, from a blade that has performed recovery procedure with call retaining. The master then resets those CICs/channels that are no longer used and sends GCP subtract commands to the MGw concerning the related TDM and ephemeral terminations. Here, the wildcarding mechanism can not be used for subtract of ephemeral terminations.

Media Gateway Master was on Failed Blade

A different blade is assigned the role of MGw master. Ongoing calls are not affected.

Route/PRA Master was on Failed Blade, Buddy Alive

Each blade receives notification about state change of other blades in the cluster. The master and buddy roles that were assigned to the failing blade are now assigned to different blades. Each blade sends a first list of CICs/channels that it has leased to the new master. Blades that so far hosted the buddy to a master on the failed blade additionally send a second list of CICs/channels that the masters on the failing blade had leased to call control collocated on the own blade. A new buddy will be created for each of the new masters and be updated the busy data of the CICs/channels that are currently leased by users on the blade the new master resides on as well as data received from the previous buddy. The new master and the MGw master then perform resetting of devices and terminations as described above.

Buddy was on Failed Blade, Master Alive

A new buddy is created and the current master sends a copy of the list of CICs/channels that are controlled by its own blade to the new buddy. There is no impact on traffic handling or maintenance activities.

Actions Performed by Other Blades at Multi-Blade Failure

No Blade is Performing Blade Recovery with Call Retaining

Master and buddy roles that became vacant due to blade failure are reassigned to other blades.

If two blades fail at the same time, then some devices will have call controller and master lost. If no blade is performing a blade recovery procedure with call retaining, then the new master can identify which circuits/channels are not used by any blade: At creation of a new master, all blades send a list of circuits they have leased to the new master. The circuits that are not indicated as leased by any blade are either idle or have been leased by any of the restarting blades, they are in unknown state.

Due to the dual blade failure, the new master can not determine which of these circuits are idle and which of them are leased to calls that are supposed to be disconnected. It will reset all these circuits/channels and subtract the respective terminations.

For the period of time that devices are in unknown state, the route/PRA master can not lease them out for new calls. Devices that any blade returns from lease are of known status can be assigned to new calls immediately.

Any seizure requests that can not be served this way are buffered (FIFO) and processed until devices are available that are known to be IDLE. At buffer overflow, the oldest seizure requests are rejected.

A new buddy is allocated for each Route/PRA master that had a buddy on a failed blade. The new buddy will be loaded with busy condition of the CICs/channels that are leased for calls controlled by the blade the (new) master resides on.

One or More Blades are Performing Blade Recovery with Call Retaining

If any blade is performing a recovery procedure that might result in calls to be retained, then no assumption can be made by the active blades about which circuits/channels leased by it can be reset. It is up to the recovering blade to decide which calls are retained. At the end of the recovery procedure, the master receives information about which circuits/channels are to be reset due to call disconnection.

When a blade hosting a master fails at the same time as a different blade and one or both of them are performing recovery procedure with call retaining, then the newly allocated master is not able to tell which of the circuits that are not reported by the remaining blades are idle and which ones are seized by the blade(s) performing such recovery procedure. It can therefore not reset any of these circuits of which the state is unknown until no more recovery procedures with call retaining are ongoing.

For the period of time that devices are in unknown state, the route/PRA master can not lease them out for new calls. Devices that any blade returns from lease are of known status can be assigned to new calls immediately unless they are blocked.

Any seizure requests that can not be served this way are buffered (FIFO) and processed until devices are available that are known to be idle. At buffer overflow, the oldest seizure requests are rejected.

A new buddy will be determined for those Route/PRA masters that have a buddy on any failed blade. The new buddy will be loaded with busy condition of the CICs/channels that are leased for calls controlled by the blade the (new) master resides on.

Buddies of lost masters on blades that do perform recovery without call retaining send to the new masters lists of circuits that the lost masters had leased to collocated call control. The new masters can immediately reset these circuits, subtract the connected terminations and re-use them.

Actions Performed by a Blade Performing Recovery with Call Retaining

Role Distribution

A blade performing recovery actions that allow calls to be retained immediately looses any master or buddy roles it had before the recovery happened. There is no information passed from the recovering blade to the new master or buddy (or any other blade) during the recovery.

CICs/Channels that do have a Master on a Different but the Recovering Blade

Any lease of CICs/channels by masters towards the recovering blade remains valid. That bade itself will determine which calls to retain and which ones to disconnect. At the end of the recovery procedure, the recovering blade sends information about which circuits/channels are to be reset due to call disconnection to the route/PRA master.

The recovering blade can not tell the state of CICs/channels for which a seizure request was sent to the blade where the master resides, but no acknowledgement was received. It could be that the seizure request was lost during the recovery procedure, but it could also be that the acknowledgement was lost. The related calls must be released and the CIC/channel is requested to be released as well. The master will only accept the release of a CIC/channel, if it was received from the same blade that seized the resource. This precaution is necessary since the CIC/channel might be seized by a different blade, if the suspected seizure was never performed by the master.

The recovering blade can not tell the state of CICs/channels for which a release request was sent but no acknowledgement was received. It could be that the release request was lost during recovery, but it could also be that the acknowledgement was lost. The related calls must be released and the recovering blade again requests CIC/channel to be released. The master will only accept the release request of a CIC/channel, if it was received from the same blade that seized the resource. This precaution is necessary since the CIC/channel might be seized by a different blade, if the suspected release was performed by the master. The master tolerates release attempt of a CIC/channel that is not in busy state.

Actions Performed by a Blade Performing Recovery without Call Retaining

Any lease of resources by that blade becomes void. The recovering blade does not report any CIC/channels to the master. The recovering blade clears all calls but does not send reset messages and subtract commands.

Example for Blade Recovery with Call Retaining

The following figures show handling of routes; the handling of PRA is done according to the same principles.

Figure 5:
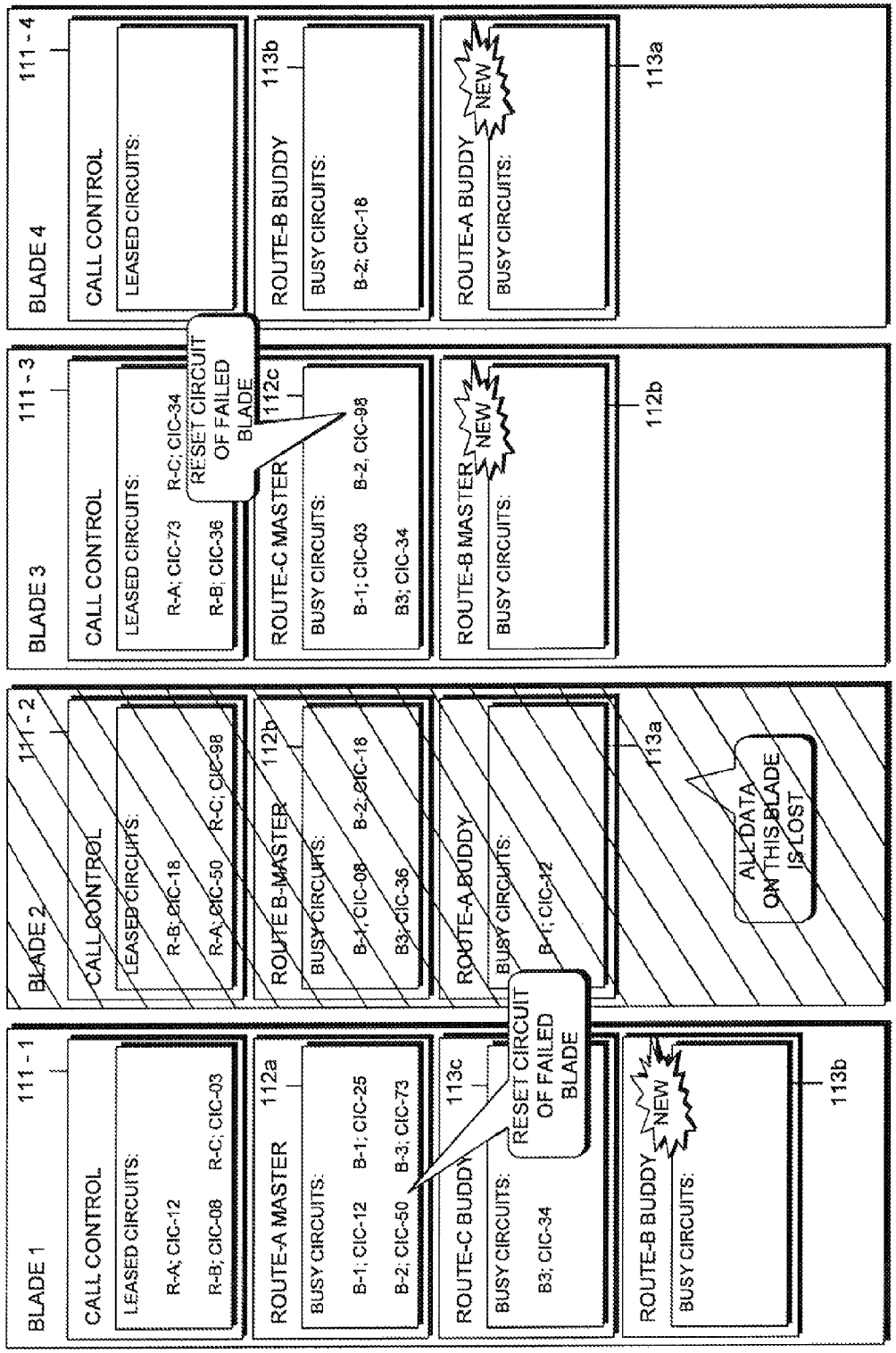
FIG. 5 shows a blade structure with four blades and allocation of master and buddy roles at a blade failure of one blade without call retaining.

FIG. 5 shows a cluster with four blades. Blade 2 leaves active state in order to perform a recovery action. During the recovery, no communication with the other blades is possible. The type of recovery does not allow any calls controlled by that blade to be retained.

The route A master 112*a* resides on blade 1. It resets all circuits that have been leased to blade 2. In the example, this is only CIC-50. The route A master sends a subtract command for the termination connected to CIC-50 of route A to the MGw.

The route C master 112*c* resides on blade 3. It resets all circuits that have been leased to blade 2. In the example, this is only CIC-98. The route C master sends a subtract command for the termination connected to CIC-98 of route C to the MGw.

The master role for route B needs to be re-assigned, because it was previously assigned to blade 2. It is now assigned to blade 3. Whenever the master role is reassigned, the buddy role is reassigned as well. The buddy role for route B is now assigned to blade 1.

The buddy role for route A needs to be re-assigned, because it was previously assigned to blade 2. It is now assigned to blade 4.

Figure 6:
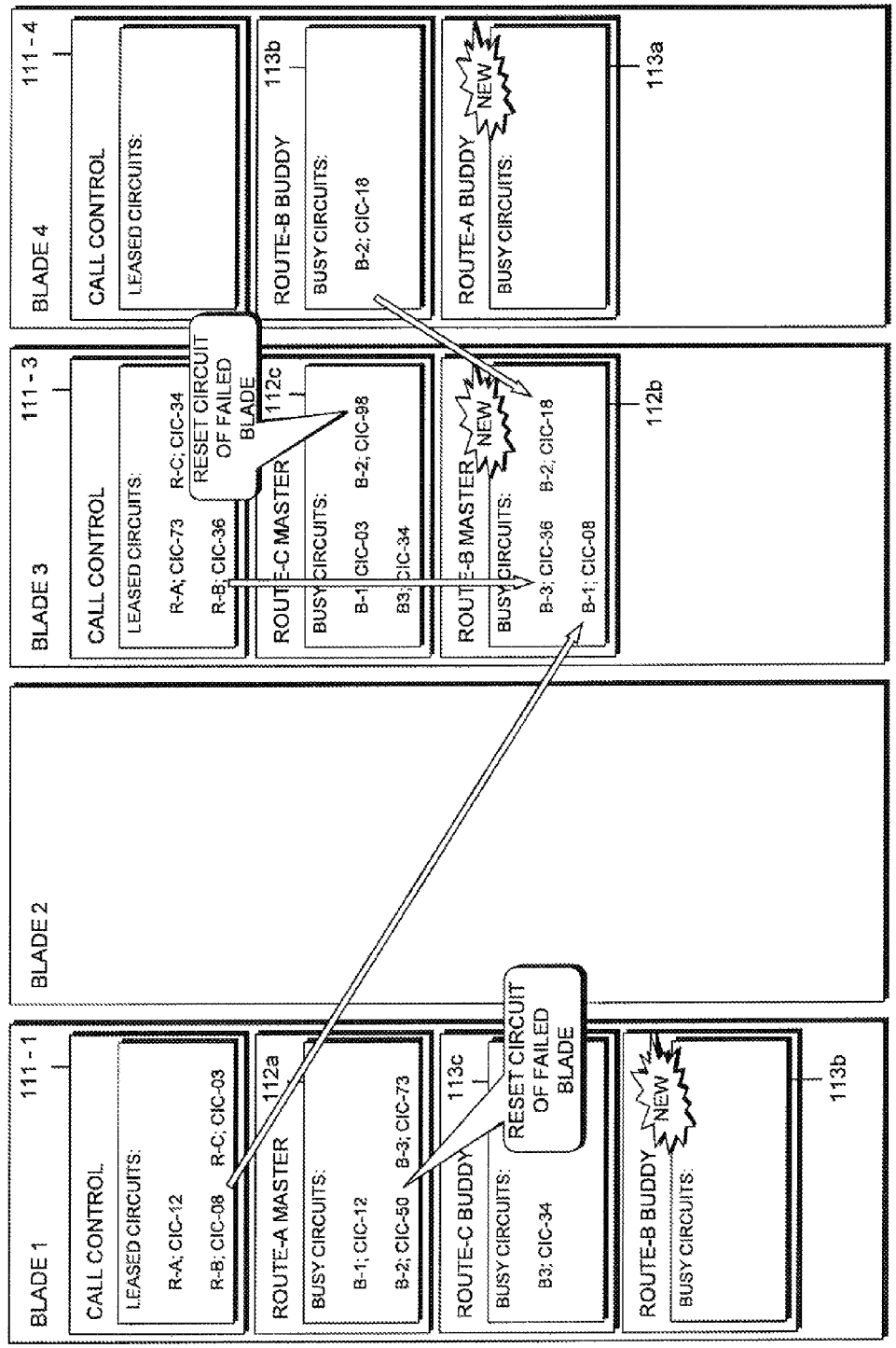
FIG. 6 shows a blade structure with a transfer of data to a new master for the structure of FIG. 5.

FIG. 6 shows how the new master of route B 112*b* now receives the CIC states from call controllers of all blades that are in active state. CIC-36 is leased by the call control 111-3 on the same blade and CIC-08 is leased by the call control 111-1 on blade 1.

The old buddy of route B 113b reports to the new master 112b of route B that CIC-18 has been leased to blade 2. In order to keep this information redundant on two blades at any time, the new master passes this data to the new buddy, see FIG. 7. The old buddy keeps the data until the entire role move sequence is successfully completed. The new master resets all circuits that had been leased to blade 2. In the example, this is only CIC-18. The new master sends a subtract command for the termination connected to CIC-18 of route A to the MGw.

The new route B master 112b reports all circuits leased to call controllers on the own blade to the new route B buddy 113b. In the example shown in FIG. 7 this is CIC-36.

Figure 7:
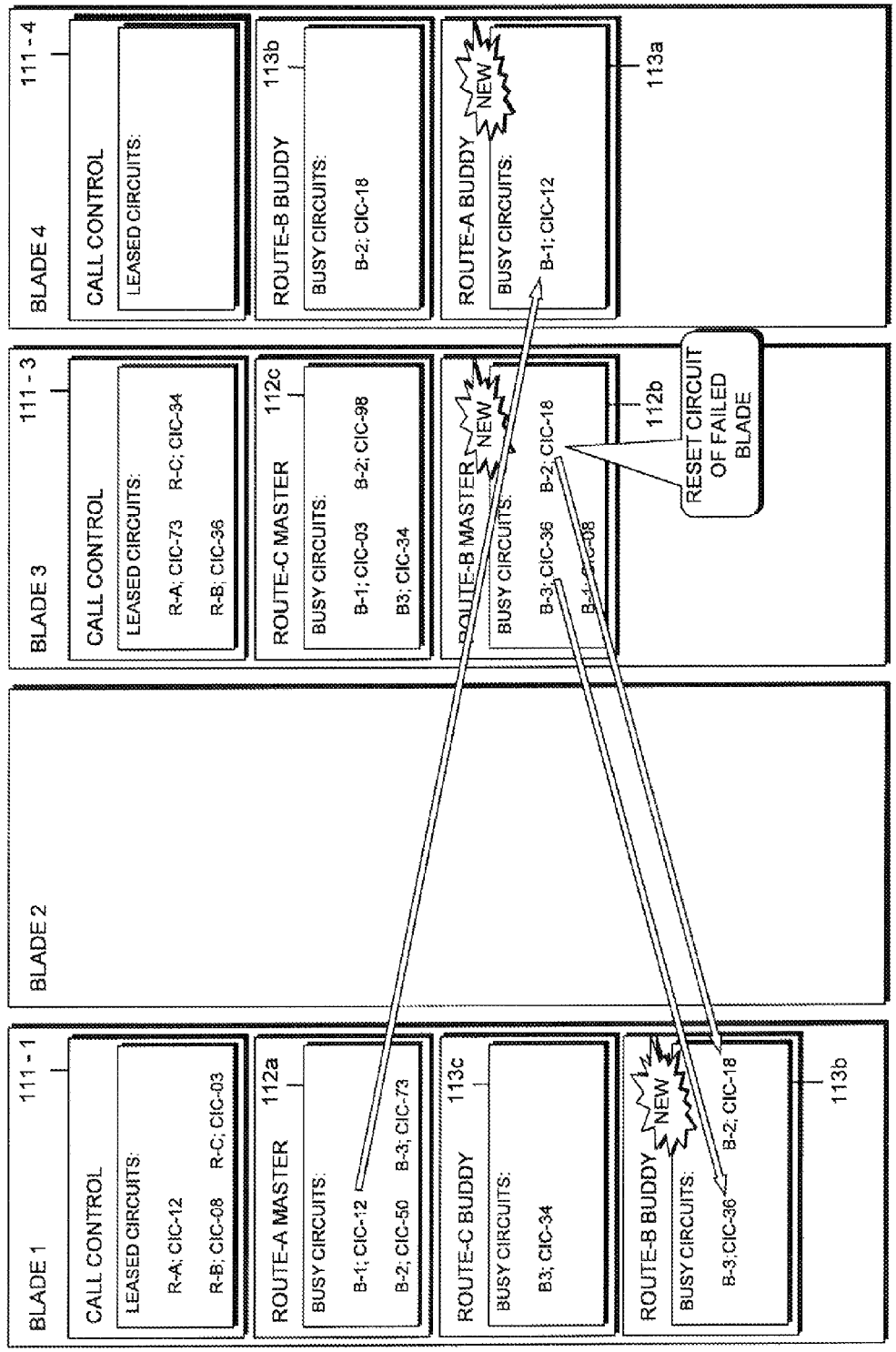
FIG. 7 shows the blade structure of FIG. 5 with a transfer of data to new buddies.

FIG. 7 shows how the master of route A 112a feeds the data related to calls controlled by the own blade to its new buddy 113a. In the example, this is CIC-12.

Example for Blade Recovery with Call Retaining

This example shows handling of routes; the handling of PRA is done according to the same principles.

Figure 15:
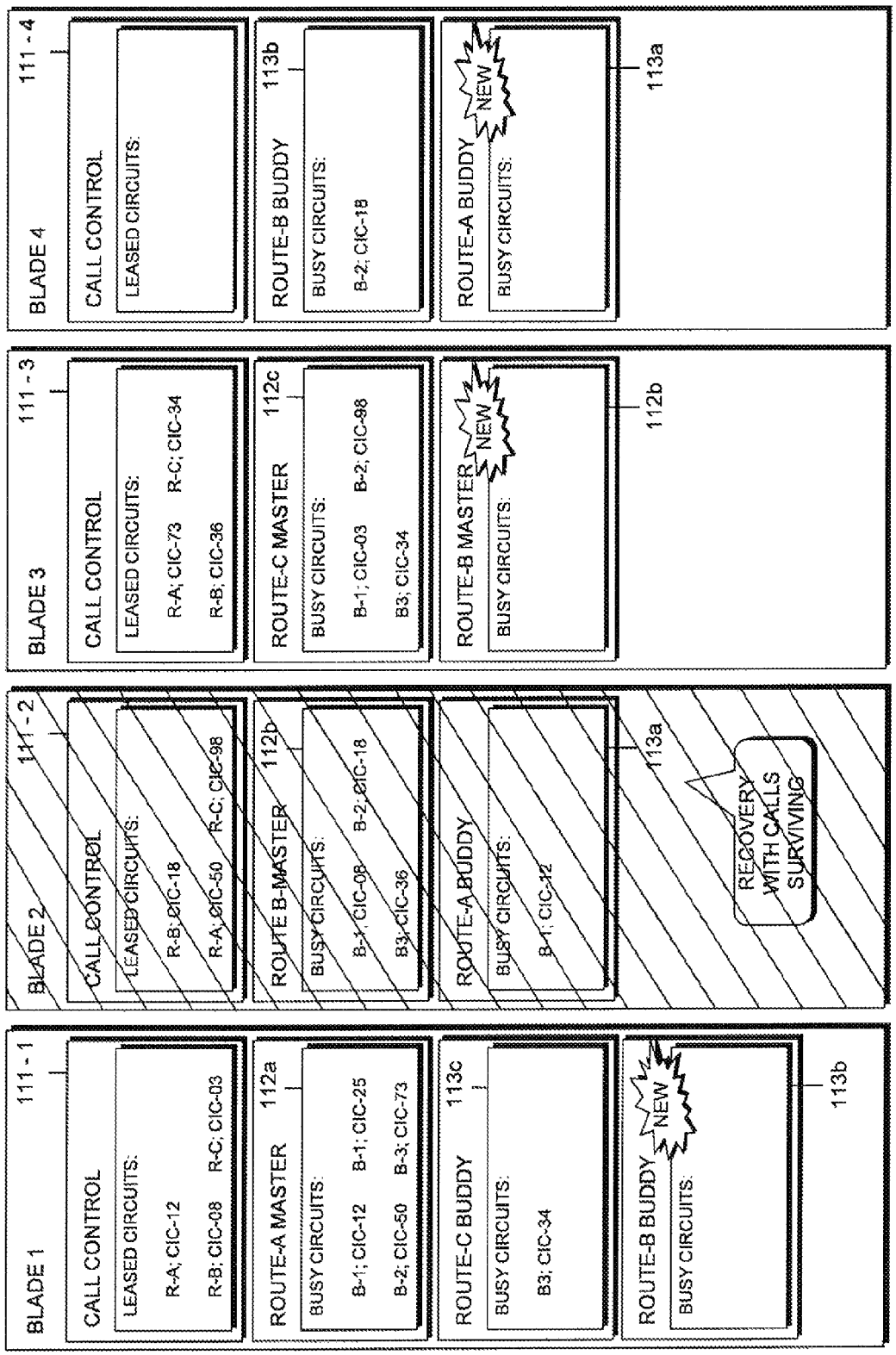
FIG. 15 shows a blade structure with four blades and allocation of master and buddy roles at a blade failure of one blade performing recovery without call retaining.

FIG. 15 shows a cluster with four blades. Blade 2 leaves active state in order to perform a recovery action. During the recovery, no communication with the other blades is possible. The type of recovery allows calls controlled by that blade to be retained. Some calls that are not considered stable will be disconnected. The other blades cannot tell which calls will be retained until the recovery of the blade is finished.

The master of route A 112a resides on blade 1. It knows all circuits that have been leased to blade 2. In the example, this is only CIC-50. The lease continues.

The master of route C 112c resides on blade 3. It knows all circuits that have been leased to blade 2. In the example, this is only CIC-98. The lease continues.

The master role for route B 112b needs to be re-assigned, because it was previously assigned to blade 2. It is now assigned to blade 3. Whenever the master role is reassigned, the buddy role is reassigned as well. The buddy role for route B now assigned to blade 1.

Figure 16:
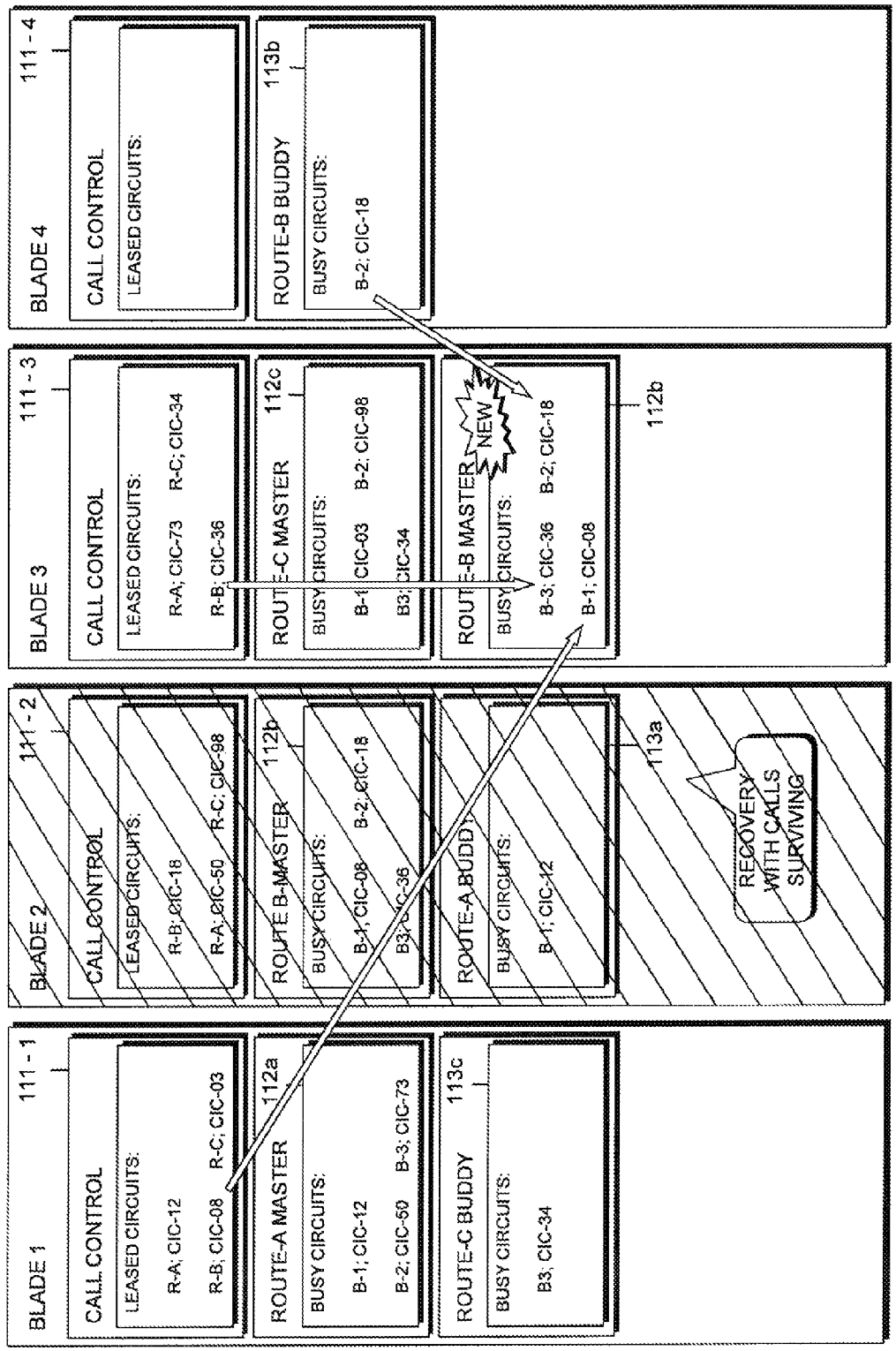
FIG. 16 shows a blade structure with a transfer of data to a new master for the structure of FIG. 15.

FIG. 16 shows how the new master of route B now receives the CIC states from call controllers of all blades that are in active state. CIC-36 is leased by the call control on the same blade and CIC-08 is leased by the call control on blade 1.

The old buddy of route B 113b reports to the new master 112b that CIC-18 has been leased to blade 2. The lease continues.

Figure 17:
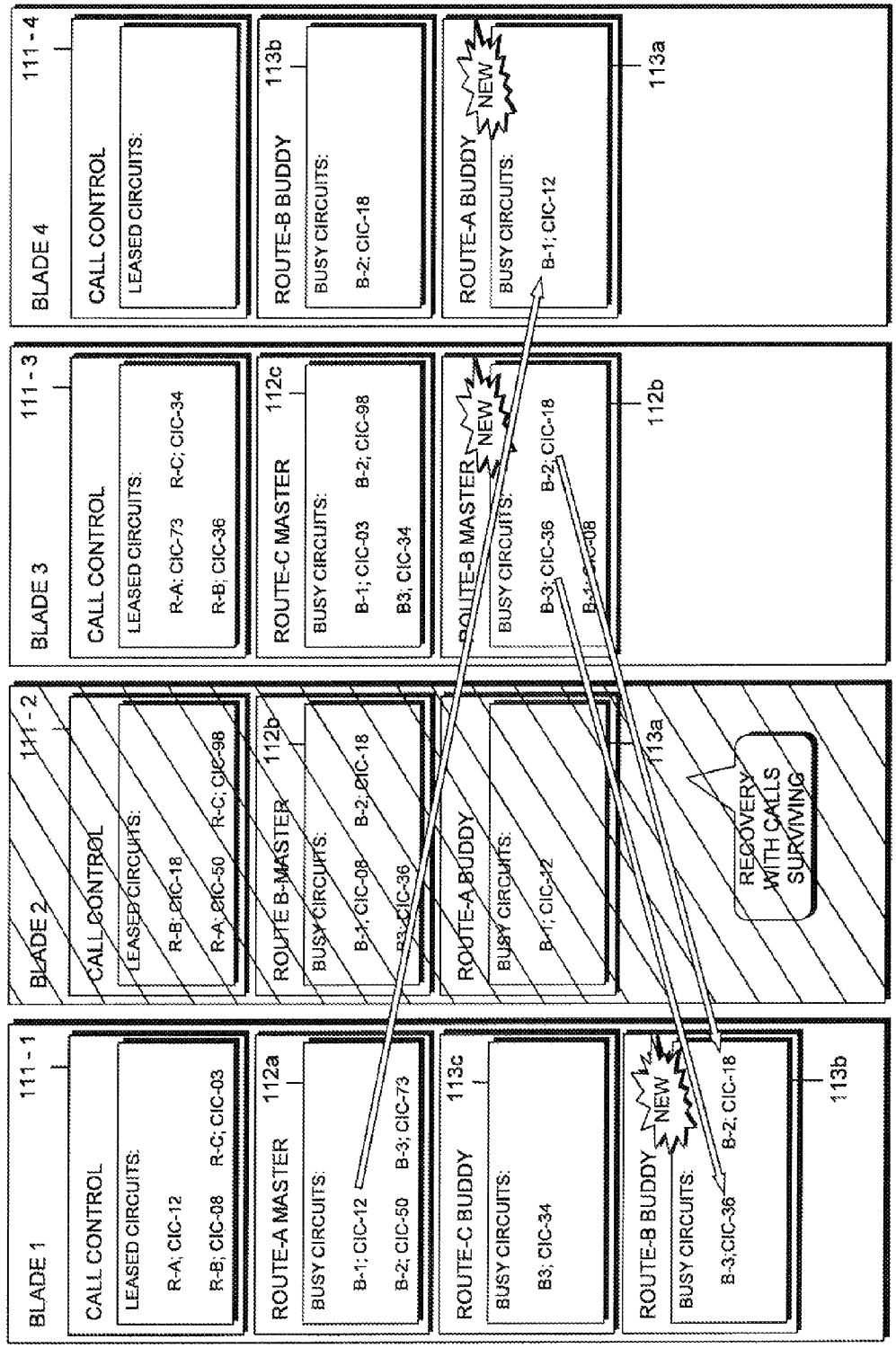
FIG. 17 shows the blade structure of FIG. 15 with a transfer of data to new buddies.

In order to keep this information redundant on two blades at any time, the new master passes this data to the new buddy, see FIG. 17. The old buddy keeps the data until the entire role move sequence is successfully completed.

The buddy role for route A needs to be re-assigned, because it was previously assigned to blade 2. It is now assigned to blade 4. FIG. 17 shows how the master of route A 112a feeds the data related to calls controlled by the own blade to its new buddy 113a. In the example, this is CIC-12.

Figure 18:
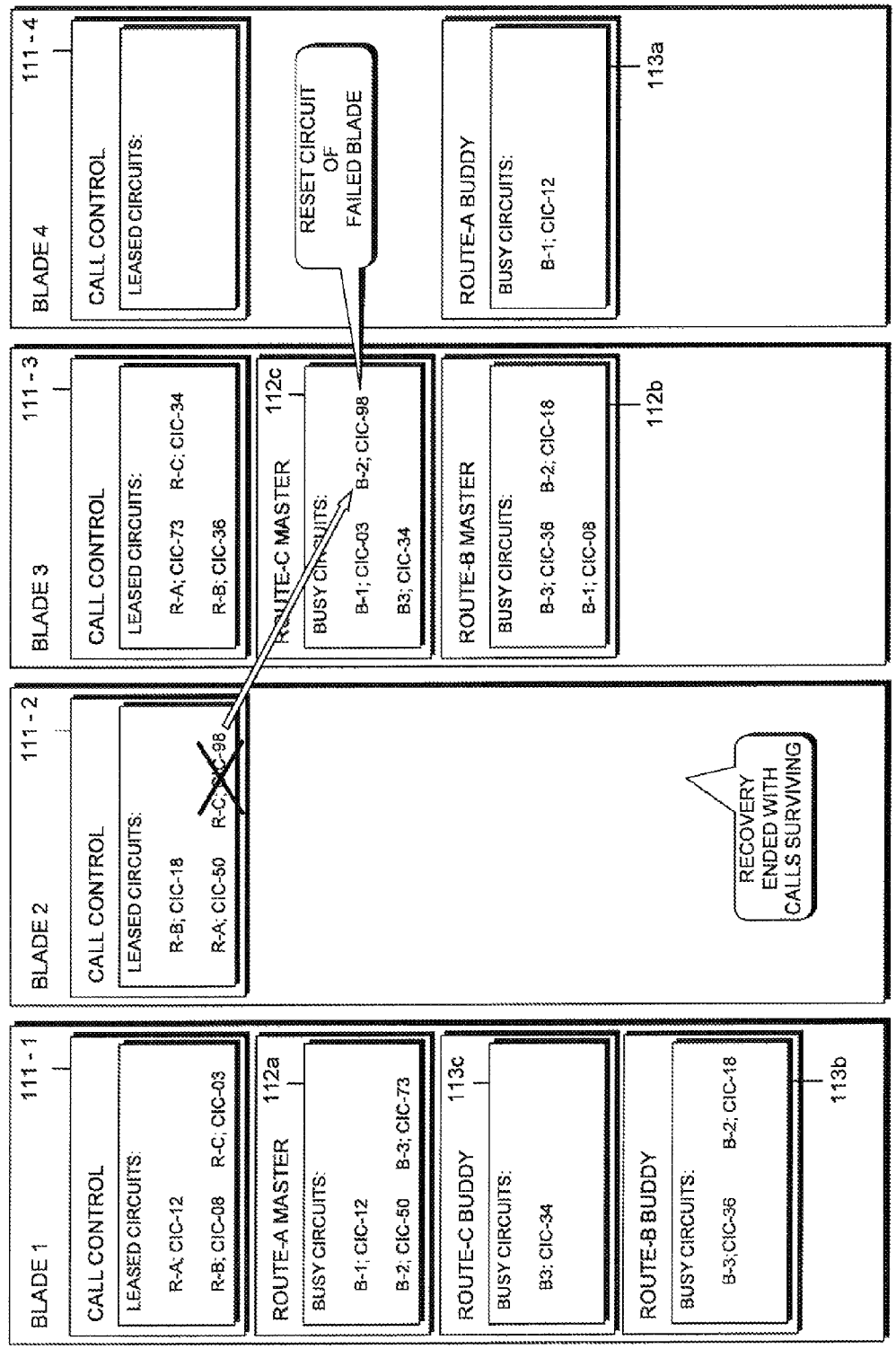
FIG. 18 shows the blade structure of FIG. 15 with a transfer of data at the end of the blade recovery.

At the end of the recovery procedure the call controller on blade 2 informs the route masters about circuits that should be reset because the call that used them was disconnected due to the recovery procedure, see FIG. 18. The respective master will reset such circuits and subtract the respective termination.

Creation of Master and Buddy
Trigger Point for Creation

When a distributable object is defined on all active blades, the coordinator decides on which blade to allocate the master and buddy roles. All blades in active state are informed by means of a broadcasted message. If only one blade in the cluster is in active state, then no buddy can be created. In such situation the buddy will be created by the coordinator later, as soon as a second blade is available.

Another trigger for creation of master and buddy is when the blade that host the master leaves the active state without a previous successful move.

Creation of Master and Buddy is also triggered when the coordinator decides that an ongoing creation has failed due to timeout.

Allocation Algorithm

The algorithm to allocate master and buddy must fulfill the following criteria:

The exchange data for an object must be defined on the target blade

Master and buddy of the same distributed object must never be allocated on the same blade.

The processing load should be distributed on all blades, so that all blades are loaded to the same percentage of their individual capacity.

Creation of Master and Buddy

Figure 8:
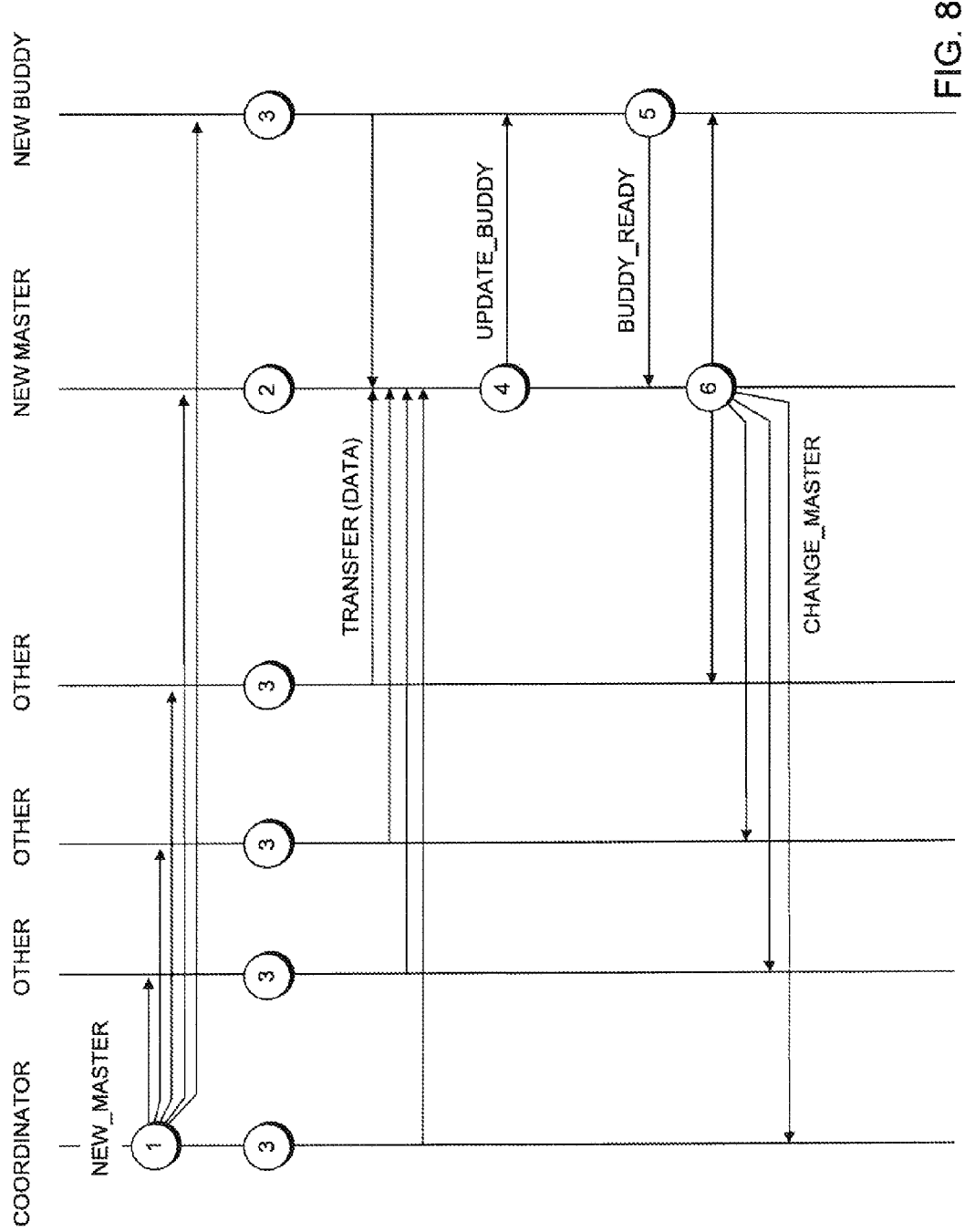
FIG. 8 shows a flowchart for the creation of a new master.

The coordinator decides which blades shall host master and buddy. The sequence is illustrated in FIG. 8. There is no transfer of data from the master to the buddy for MGws. Steps that do not apply to MGW objects are pointed out in the stepwise description below.

When master and buddy are created, there is no way to known if master and buddy existed before. Calls may be going on and calls might have been disconnected in the absence of master and buddy. Release requests for leased resources that are buffered at a call controlling blade might be lost due to recovery procedures of that blade. Therefore, the possibility that circuits and terminations are leased by a failed blade and would be hanging cannot be excluded. As a remedy, any resource that does not have a known leaser needs to be reset, unless a recovery action with call retaining is ongoing on a non-traffic-handling blade.

Step 1: The active blade with the smallest age rank always has the coordinator role. It determines the blades that shall host the new master and the new buddy.

The coordinator then triggers the creation procedure by multicasting NEW_MASTER message to all active blades. The roles are thereby assigned without further acknowledgement message.

Step 2: This step does not apply to MGws. The new master is now prepared to receive data from the other blades. The master will compile the data received from the other blades to build a complete busy/idle table for all resources it is responsible for.

Step 3: This step does not apply to MGws. With message TRANSFER all blades in active state except for the one hosting the master, provide their data that the new master needs to perform the master role.

Step 4: This step does not apply to MGws. The master provides a copy of the data related to call control on the own blade to the buddy by sending UPDATE_BUDDY.

Step 5: The buddy indicates with BUDDY READY message to the master that it has received and stored data from the master and that it is ready to take the role of buddy.

Step 6: The new master multicasts CHANGE_MASTER message to all active blades. Now the new master must reset all resources that might have been leased by it's predecessor (and possibly other blades that have left active state during absence of a master). The new master must wait until no blade is performing recovery with call retaining and then, dependent on the type of resources it is responsible for, reset all circuits, B-channels or subtract all terminations that are not currently leased by any blade including itself. A windowing mechanism should be implemented to throttle the massive flow of subtract messages in order to prevent overloading of the MGw.

Move of Master and Buddy

General

In order to balance the processor- and inter-blade signaling load, it can become necessary to move the mastership role for an individual route, PRA or MGw to a different blade.

Another trigger for move of mastership is that the coordinator detects that a blade leaves the active state. The coordinator will then trigger moving of any master or buddy roles, which that blade hosts, to other blades. If there is no active blade that the master can be moved to, then the old master will eventually cease to exist and the role of master becomes vacant.

Any sequence to move the master to a different blade must be robust against unavailability of any blade at any given time. The protocol that carries the relevant messages provides means to get a positive confirmation that all intended receiver blades have received a certain message. A blade returning after failure has to get the latest status from any other blade. Unless the recovering blade plays a vital role in the move process, such event shall not disrupt the move. The protocol carrier needs to guarantee cluster global ordering, i.e. messages sent through that carrier are always received in the same order on all blades.

In order to reduce the number of potential error scenarios, the number of messages sent between blades is kept to a minimum.

For the duration of the move of route/PRA master, new calls can not be established for the respective route/PRA. The move of MGw master does not lead to any traffic disturbance.

A move is initiated from the coordinator blade by multicasting of MOVE_MASTER. It is terminated either by multicast of CHANGE_MASTER or NOT_MOVED or when one of the blades that are designated for master or buddy roles leave the active state. Details are described in the following chapters.

If one or more blades are not reachable, or if there is a split brain situation in the cluster, no broadcast or multicast is possible. The allocation of masters and buddies will be frozen, because moves can neither be started nor finished. As a consequence, if both master and buddy fail either simultaneously or sequentially, the role will be vacant and the respective object cannot be used by the system any more. As soon as communication is possible again, the coordinator will trigger creation of master and buddy.

Successful Move of Mastership

The inter-blade communication sequence is the same as for creation of master and buddy, shown in FIG. 8. Upon reception of NEW_MASTER message, the current master suspends its role until the sequence is either successfully finished or aborted.

During a move sequence, there is no data transferred between old and new buddy. The new buddy will hold a completely different set of data than the old buddy, because the master is allocated on a different blade. The old buddy will keep the data until the move sequence is terminated; should the sequence be aborted, the role allocations fall back to the assignment that was valid before the move.

Handling of Service Requests During Move of Master

Call processing continues during move of master. During the time that data is transferred between old and new master, a call controller might want to lease a channel/circuit or to release it. The move procedure must be designed with special care to avoid inconsistencies that can be caused by modifying data that is being moved to a new blade. The move is only completed, when the destination has taken the role of master. Until then, it can abort at any time due to recovery actions or outage of the destination blade. Data must remain consistent also in such scenario.

In order to avoid inconsistencies, service requests that are related to the moved object and impact the transferred data are buffered for the entire duration of the move.

Figure 9:
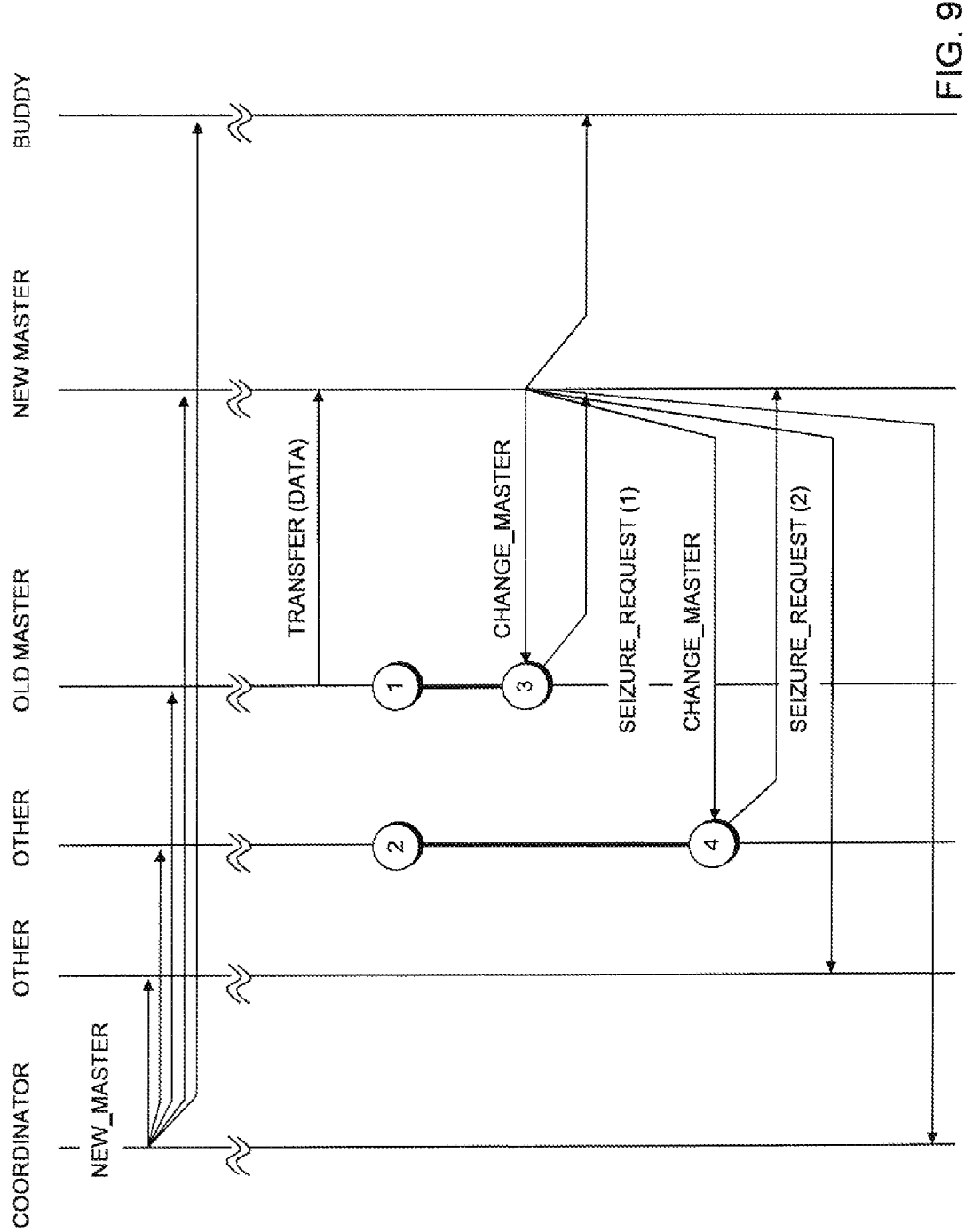
FIG. 9 shows the flowchart for buffering of service requests by the user during move of master.

FIG. 9 shows the handling of service requests during move of master role. Buffering is performed by the call controlling blade between reception of NEW_MASTER and CHANGE_MASTER to the master blade.

Step 1: A seizure can be tried for calls controlled by the old master blade. The blade waits until reception of CHANGE_MASTER before processing the request.

Step 2: A seizure can be tried for calls controlled by other blades. That blade waits until reception of CHANGE_MASTER.

Step 3: At reception of CHANGE_MASTER, the call controlling blade that was hosting the old master sends buffered SEIZURE_REQUEST messages to the new master blade.

Step 4: At reception of CHANGE_MASTER, any call controlling blade sends buffered SEIZURE_REQUEST messages to the new master blade.

Exceptional Scenarios During Explicit Move of Mastership

Figure 10:
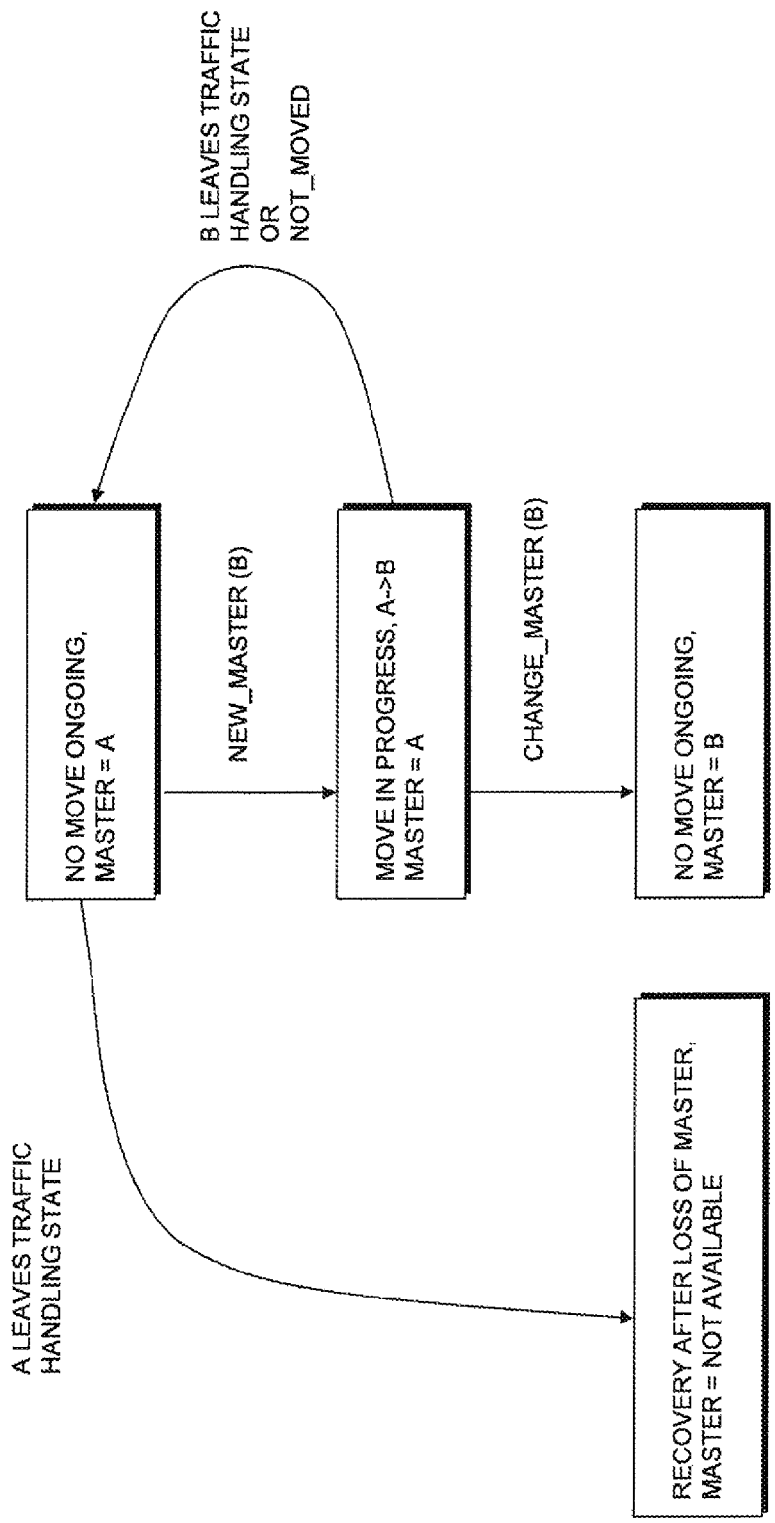
FIG. 10 shows a state machine of master movement.

The principle is that at any time, all blades have sufficient information to determine if the move is still ongoing, or if it terminated successfully or not. FIG. 10 shows the move related state machine that is maintained on each active blade for all masters. The transitions are triggered either by sending or reception of the named messages.

In the following the consequences of blade outages and communication problems are described in connection with FIG. 11.

Figure 11:
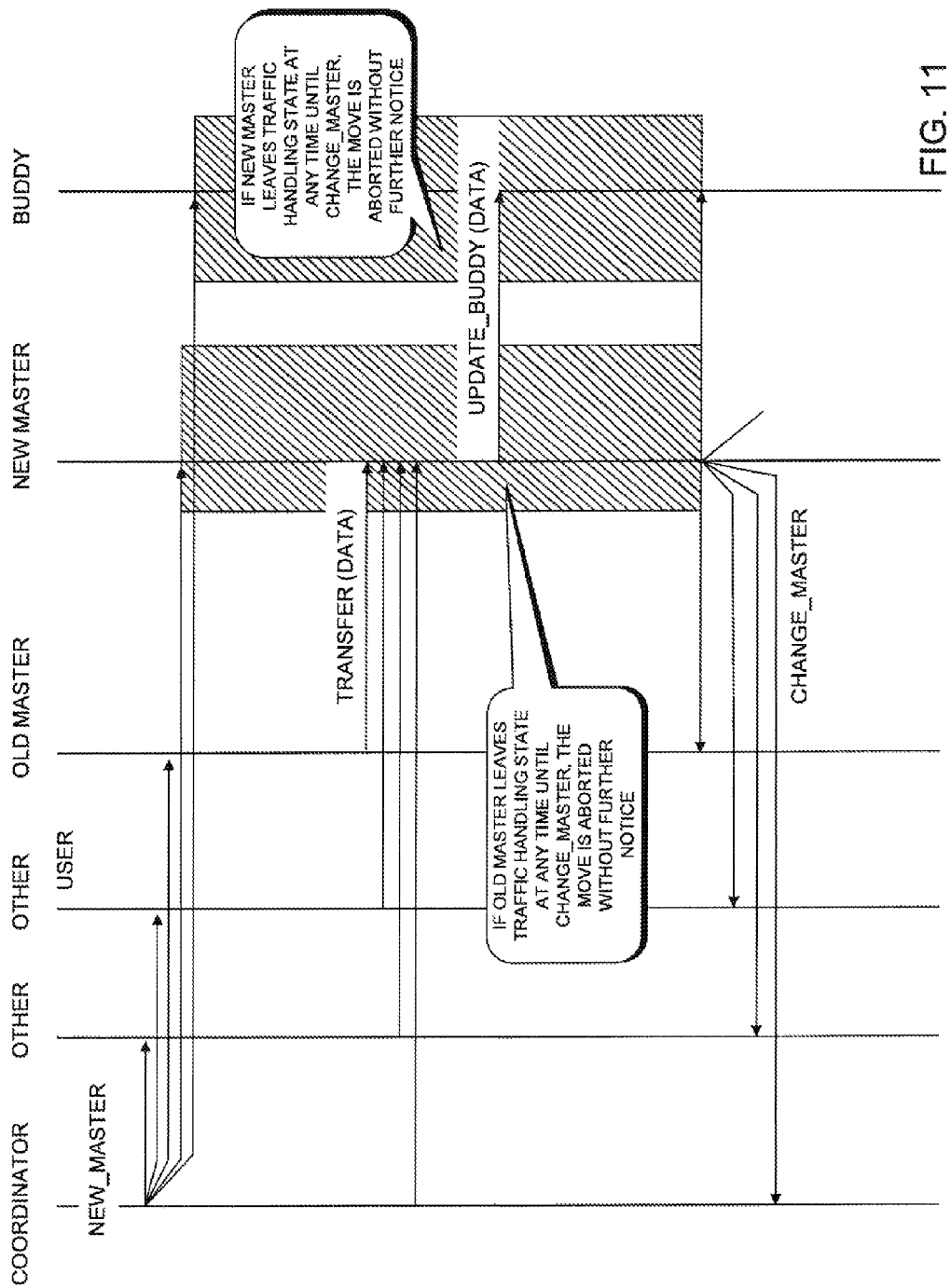
FIG. 11 shows a flowchart with a blade changing state during move of master.

If master or buddy fail during the time span that is hatched in FIG. 11, then the move is aborted.

Timeout of Move Operation

All blades run time supervision of every ongoing move operation. At timeout the coordinator will try to create a new master and buddy by repeating the procedure starting with MOVE_MASTER. Preferably it will try to allocate the roles on different blades than before.

Coordinator Role Moves:

The coordinator role only moves if the blade hosting the current coordinator leaves active state. Should the coordinator role move at any time before reception of CHANGE_MASTER, there would be no impact on the sequence of moving the master. All remaining blades in active state have sufficient information to take over the coordinator role at any time. The remaining blade with smallest age rank, i.e. the one that has been in active state for the longest time, will resume coordination role. It will be aware of the ongoing move, since it received the MOVE_MASTER message in the same way as all others did. It must not trigger any additional rebalancing action before the ongoing move terminates either successfully or unsuccessfully. It will use the already running supervision timers on the own blade for the ongoing move sequences.

New Blade Becomes Active During Move:

A blade that wants to join active state will receive the current status and allocation of masters and buddies from the blade with the smallest age rank in an ALLOCATION_TABLE message. It will know if a move is ongoing and will be included in the recipients list of CHANGE_MASTER, because the new master is made aware of the state change of the new user through the cluster group communication service.

Other Blade Changes State During Move:

The fact that a blade that is neither designated for master nor buddy has changed the blade state does not affect the move sequence.

Designated Master or Buddy Leaves Active State During Move:

All blades in active state will be informed by the cluster handler service if any of the blades hosting the new master or new buddy leave the active state. If this happens during the time span shown hatched in FIG. 11, i.e. if the remaining blades have not received CHANGE_MASTER by then, they will abort the move and act as if MOVE_MASTER was never received. If the information arrives after reception of CHANGE_MASTER, the move is considered successfully completed and normal recovery actions at outage of the master are taken.

Broadcast or Multicast not Possible:

If MOVE_MASTER has been sent already, and broadcast or multicast of NOT_MOVED or CHANGE_MASTER is not possible, the coordinator will detect timeout of move operation and the handling described above applies. Incapability of moving mastership can in the long run reduce the capacity and/or connectivity of the node. The system will recover from this condition as soon as communication is possible again.

Move of Buddy

General

In order to balance the processor and inter-blade signaling load, it can become necessary to move the buddy role for an individual route, PRA or MGw to a different blade. Move of buddy is only possible if at least three blades are in active state: One for the master, one for the current buddy role and another one as target of the buddy move.

On the blade that hosts the master new calls can not be established for the respective route/PRA as long as the buddy move is ongoing. The reason is that otherwise, the circuit/channel state can not be kept redundant on two different blades. The move of MGw buddy does not lead to any traffic disturbance.

The coordinator will detect that a blade leaves active state and will trigger moving of any master or buddy roles, which that blade hosts, to other blades. If there is no blade in active state that the buddy can be moved to, then the old buddy will cease to exist and the role of buddy will become vacant.

Any sequence to move the buddy to a different blade must be robust against unavailability of any blade at any given time. The group communication service provides means to get a positive confirmation that all intended receiver blades have received a certain message. A blade returning to active state will receive the latest allocation information from the coordinator with ALLOCATION_TABLE message.

In order to reduce the number of potential error scenarios, the number of messages sent between blades is kept to a minimum.

Successful Move of Buddyship

Figure 12:
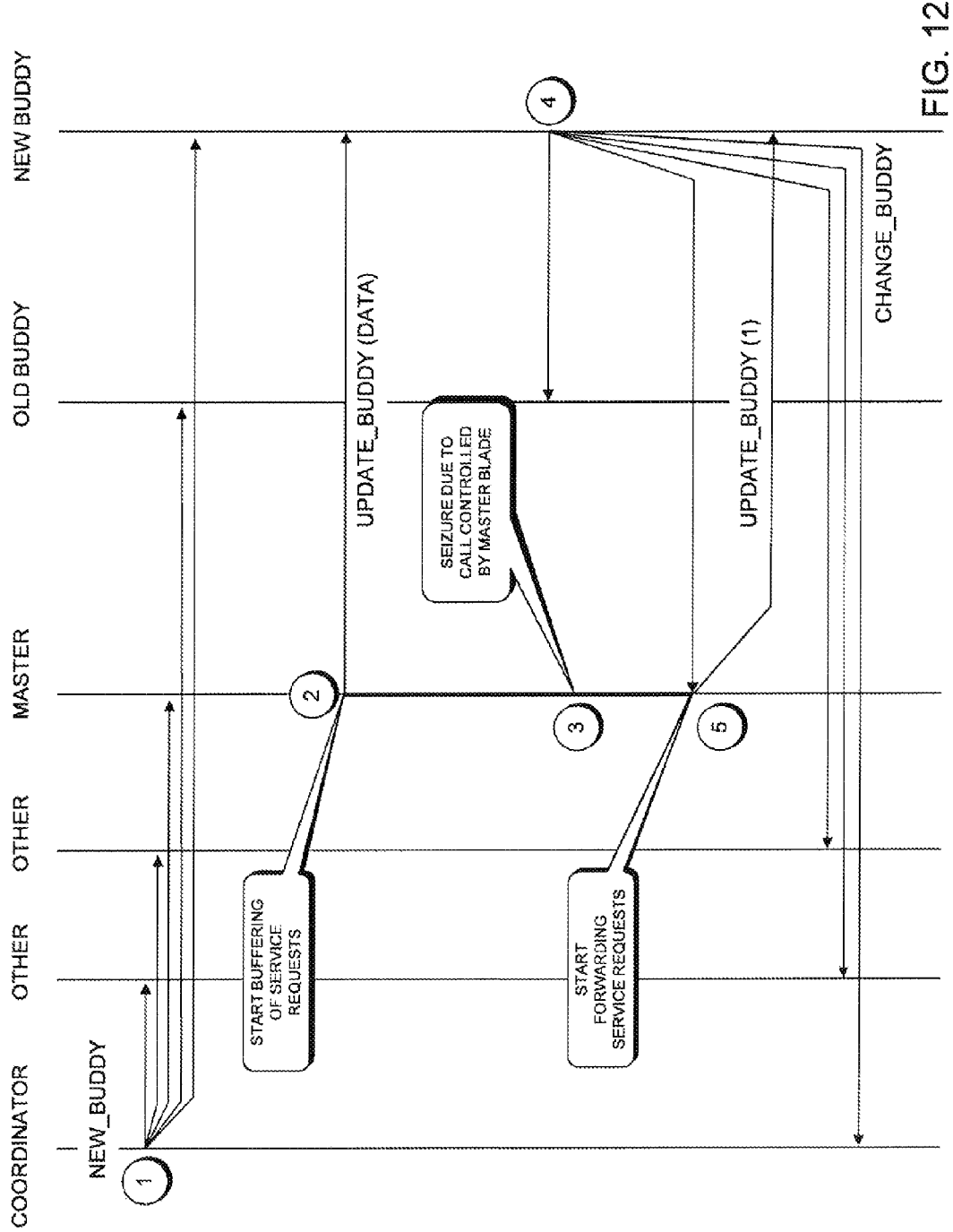
FIG. 12 shows a flowchart showing a successful move of a buddy.

FIG. 12 shows the message sequence without interfering service requests or fault scenarios.

Step 1: The blade which has been in active state for the longest time (coordinator) determines which buddy should be moved and which destination is should be moved to. It then triggers the procedure by multicasting MOVE_BUDDY message to all blades in active state.

Step 2: The blade where the master resides compiles all data, which the new buddy needs and sends it in UPDATE_BUDDY message to the designated buddy.

Step 3: The master must take care that ongoing processes do not impact data to be transferred to the new buddy; otherwise the new buddy would miss the related information. Such requests are only originating from the call controller on the same blade. The blade the master resides on will buffer such seizure or release requests and not send any related update messages to the buddy between reception of MOVE_BUDDY and CHANGE_BUDDY to the buddy blade.

Step 4: The service instance on the new buddy blade then multicasts CHANGE_BUDDY message to all blades in active state. The old buddy blade takes CHANGE_BUDDY as indication that the blade has lost the buddy role. It deletes all buddy data that was kept in case the move would be unsuccessful.

Step 5: When the master blade receives the CHANGE_BUDDY message, it starts processing of service requests from the own call controller. It sends UPDATE_BUDDY message to the new buddy blade for any changed CIC state.

Failure Scenarios During Move of Buddy Role

Figure 13:
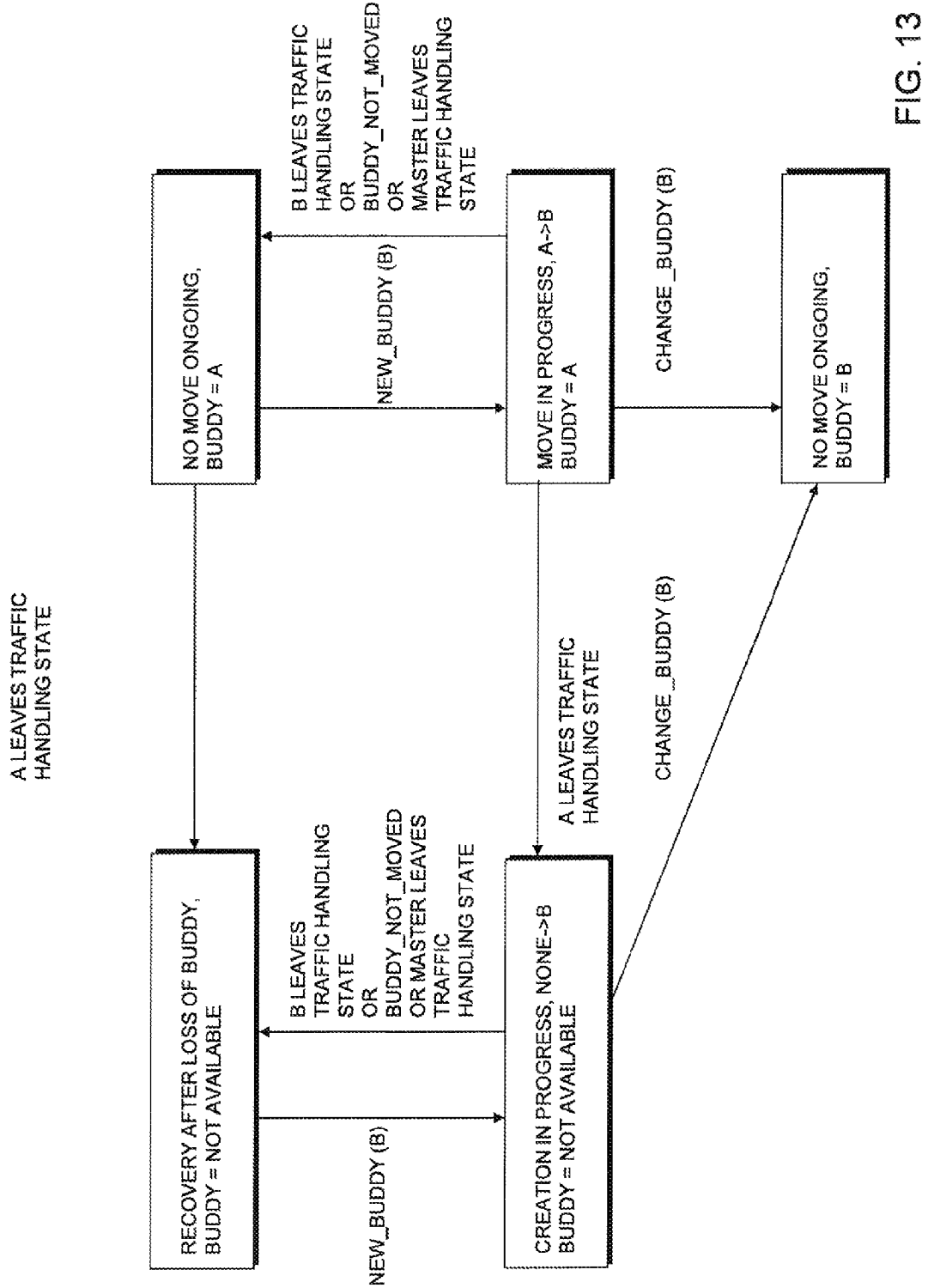
FIG. 13 shows a state machine for a buddy and FIG. 14 shows a flowchart during move of buddy.

The principle is that at any time, all blades have sufficient information to determine if the move is still ongoing, or if it terminated successfully or not. FIG. 13 shows the move related state machine that is maintained on each active blade for all buddies. The transitions are triggered either by sending or reception of the named messages or by blade state changes.

Figure 14:
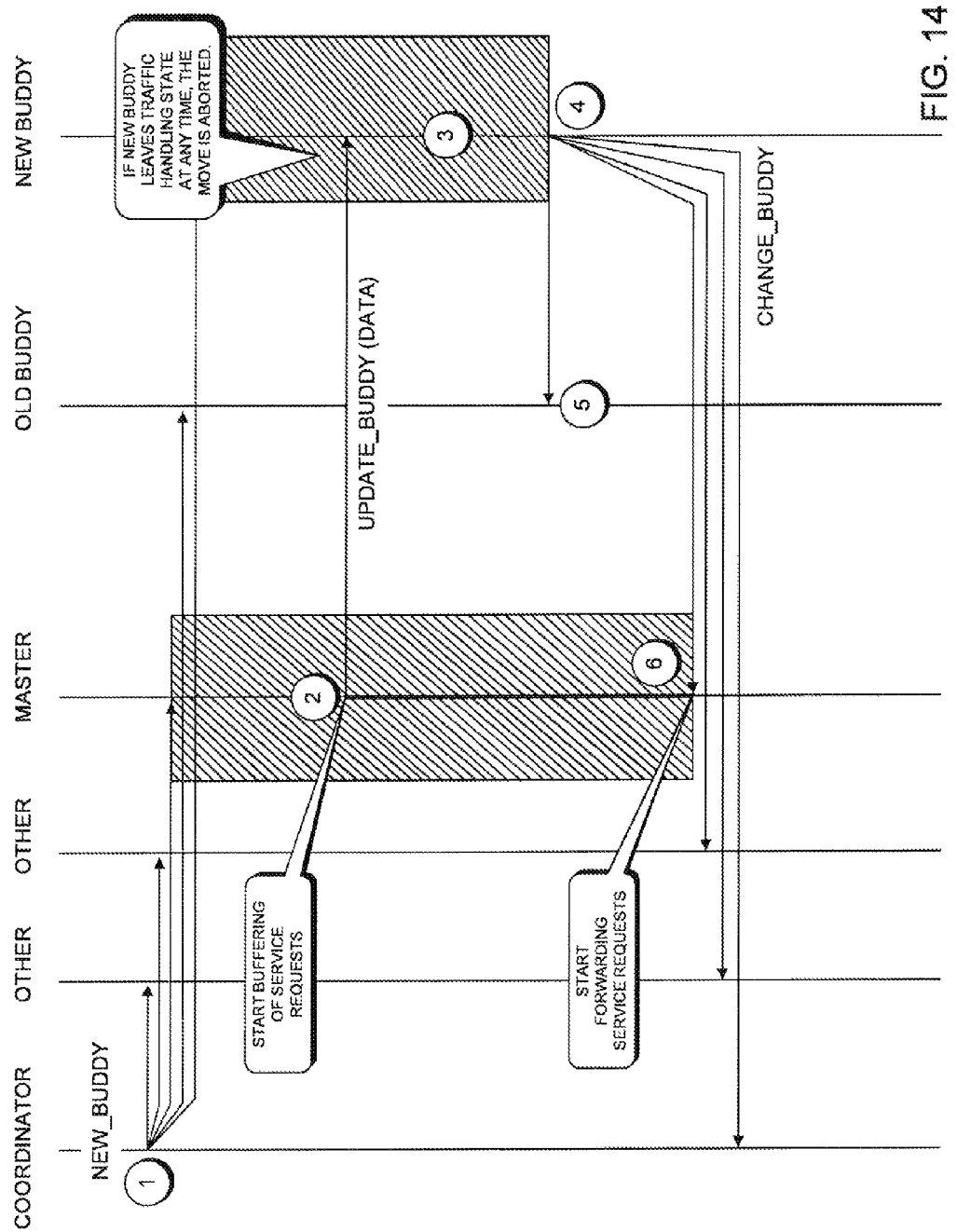

All blades in active state will be informed by the cluster handler service if any of the blades hosting the master or new buddy leave the active state. If this happens during the time span shown hatched in FIG. 14, i.e. if the remaining blades have not received CHANGE_BUDDY by then, they will abort the move and act as if MOVE_BUDDY was never received. If the information arrives after reception of CHANGE_BUDDY, the move is considered successfully completed and normal recovery actions at outage of the buddy are taken.

In the following the possibilities for each role that a blade can host are discussed.

Timeout of Move Operation

Every blade runs time supervision of every ongoing move operation. At timeout the coordinator will try to create a new buddy by repeating the procedure starting with MOVE_BUDDY. The master will know that the ongoing move failed when it receives BUDDY_NOT_MOVED or when it receives MOVE_BUDDY without having received BUDDY_NOT_MOVED or CHANGE_BUDDY before. There is no need to disconnect any calls since the information that shall be sent to the buddy is still buffered by the master and the old buddy.

Coordinator Lost:

Should the coordinator move (under conditions as described above) at any time before reception of CHANGE_BUDDY, there would be no impact on the sequence of move. All blades in active state have sufficient information to take over the coordinator role at any time. The remaining blade that has been for the longest time in active state will resume coordination role. It will be aware of the ongoing move, since it received the MOVE_BUDDY message in the same way as all others did. It will use the already started supervision timers on the own blade for the ongoing move operations.

New Blade Joins Active State During Move:

A blade that wants to join active state will get the current status and allocation of masters and buddies from the coordinator blade with ALLOCATION_TABLE message. It will know if a move is ongoing and will be included in the recipients list of CHANGE_BUDDY, because the new buddy is made aware of the state change.

Other Blade Changes State During Move:

The fact that a blade that does neither host the master nor the designated buddy has changed the blade state does not affect the move.

Old Buddy not Available at Start of Move:
The sequence is the same as if the buddy would be available.

Old Buddy Lost During Move:
If the old buddy leaves active state, the move will continue unaffected. Should the move fail, the buddy role will be vacant. The coordinator will then try to assign a new buddy.

Designated Buddy Lost During Move:
All blades will be informed if the blade hosting the designated buddy leaves active state. If they have not received CHANGE_BUDDY by then, they will act as if no move was ever attempted. If the information arrives after reception of CHANGE_BUDDY, normal recovery actions at outage of the buddy are taken, i.e. a new buddy will be created by the coordinator.

Master Lost During Move:
All blades will be informed if the blade hosting the master leaves active state. If the master becomes unavailable at any time before CHANGE_BUDDY was sent, then the buddy move is aborted and the blades will act as if no move was ever attempted.

Broadcast or Multicast not Possible:
If MOVE_BUDDY has been sent already, and broadcast or multicast of CHANGE_BUDDY is not possible, the coordinator will detect timeout of move operation and the handling described above applies. The system will recover from this condition as soon as communication is possible again.

Summarizing, the invention allows a scalable blade system to allocate object instances which coordinate common resources to individual blades. Allocation is done in a dynamic way that adapts to change of blade states and to change of number of blades. Redundancy of information is guaranteed at any time.

What is claimed is:

1. A switching center server comprising:
a blade cluster including a plurality of blades that have access to a plurality of resource pools for handling a call, wherein resources in any given one of the resource pools comprise resources at a media gateway that are switched under the control of the switching center server; and
a master for each resource pool, each master provided on one of the blades and configured to centrally coordinate the blades' use of resources in the corresponding resource pool.

2. The switching center server according to claim 1, wherein two different blades provide information about the used resources for said call.

3. The switching center server according to claim 1, further comprising a call controller provided on one of the blades and configured to control resources for said call.

4. The switching center server according to claim 3, further comprising a buddy for one of the masters and residing on a different blade than the corresponding master, the buddy containing the information about the resources controlled by a call controller residing on the same blade as the master.

5. The switching center server according to claim 4, further comprising a coordinator configured, if a blade fails, to:
create at least one of a new master as a replacement for a master present on the failed blade and a new buddy as a replacement for a buddy present on the failed blade; and
allocate the new master, if created, to a first blade in said blade cluster; and
allocate the new buddy, if created, to a second blade in said blade cluster.

6. The switching center server according to claim 5, wherein, if the coordinator creates a new master on the first new blade, the other blades transmit a list of used resources for said call to the new master.

7. The switching center server according claim 5, wherein the coordinator detects the signaling load of the blades and moves the masters and buddies for different resource pools to different blades depending on the signaling load of the different blades.

8. The switching center server according to claim 1, wherein each blade further comprises a blade status information unit configured to determine the status of the blade and to inform the other blades of any blade status changes.

9. The switching center server according to claim 1, wherein each blade comprises a blade recovery unit configured, if the blade fails, to carry out a blade recovery procedure, the blade recovery unit configured to decide which calls handled by the failed blade to retain and to transmit information indicating the resources used for those calls to the corresponding master.

10. The switching center server according to claim 1, wherein each blade comprises a group communication service unit configured to control delivery of messages to other blades, the messages being delivered to each blade in the same order.

11. The switching center server according to claim 1, comprising a route master for each route of a trunk, or an access master for each Integrated Digital Service Network (ISDN) access.

12. The switching center server according to claim 11, further comprising a call controller provided on one of the blades and configured to control resources for said call, requesting control over resources from the route master or access master and returning control when the resources are no longer needed.

13. The switching center server according to claim 1, further comprising a media gateway master configured to control handling of maintenance messages of a media gateway.

14. A method for controlling a switching center server, the server having a blade cluster with a plurality of blades, wherein the plurality of blades have access to a plurality of resource pools for handling a call, wherein resources in any given one of the resource pools comprise resources at a media gateway that are switched under the control of the switching center server, the method comprising, for each resource pool, coordinating the blades' use of resources in the pool at a master dedicated to that pool.

15. The method according to claim 14, wherein the switching center server comprises a route master for each route of a trunk, or an access master for each Integrated Digital Service Network (ISDN) access, and further comprises a call controller configured to control resources for a call, and wherein the method further comprises performing at the call controller at least one of:
setting up said call,
supervising said call,
disconnecting said call, and
requesting control over resources from the route master or access master, and returning control when the resources are no longer needed.

16. The method according to claim 15, wherein the method comprises providing information about the used resources present on a first blade where the call controller resides on a second blade.

17. The method according to claim 14, further comprising detecting a status change of at least one of the blades, and, if such a change is detected, informing the other blades of that change.

18. The method according to claim 14, further comprising detecting failure of a blade, and
detecting whether a recovery procedure is carried out for the failed blade, wherein the recovery procedure retains calls handled by the failed blade and continues to use the resources for such call controlled by the failed blade.

19. The method according to claim 14, further comprising:
detecting failure of a blade, and
detecting whether a recovery procedure is carried out for the failed blade, wherein the recovery procedure transmits information to the corresponding master indicating resources used by the failed blade for calls not retained upon recovery, thereby enabling the master to reset those resources.

20. The method according to claim 14, further comprising:
detecting failure of a blade on which a master is present;
creating a new master on a new blade as a replacement for the master present on the failed blade; and
transmitting, from each of the other blades to the new master, a first list of resources used by the other blade.

21. The method according to claim 20, wherein a call controller resides on the failed blade, said method further comprising:
transmitting, from a buddy for the master on the failed blade to said new master, a second list of resources used by the master on the failed blade.

22. The method according to claim 21, further comprising resetting resources not present on said first or second lists of resources.

23. The method according to claim 22, wherein resetting resources not present on said first or second lists of resources is performed when no recovery procedure is performed that may result in continuous use of the resources.

24. The method according to claim 14, further comprising:
detecting whether more than one blade is in an active state; and
if so, creating a buddy on a first one of the blades for a master on a second one of the blades.

25. The method according to claim 14, further comprising:
detecting failure of a blade on which a master is present;
creating a new master on a new blade, as a replacement for the master present on the failed blade; and
creating a new buddy for the new master.

26. The method according to claim 14, further comprising:
detecting failure of a blade on which a buddy is present;
creating a new buddy on a new blade, as a replacement for the buddy present on the failed blade.

27. The method according to claim 14, wherein the switching center server further comprise a coordinator, and wherein the method further comprises:
detecting failure of a blade on which a master is present;
creating a new master on a new blade, as a replacement for the master present on the failed blade, said creation comprising at least one of:
determining, by the coordinator, on which blade the new master is created,
transmitting, from the coordinator to other blades, information indicating that the new master is being created,
building, by the new master, a status table of resources used by each blade,
transmitting, from the other blades to the new master, information needed by the new master for coordinating the blades' usage of the pooled resources,
transferring, from said new master to a buddy, a copy of data related to calls controlled by said new blade,
transmitting, from said buddy to said new master, information indicating that that the buddy has successfully stored said data,
transmitting, from the new master to the other blades, information indicating that creation of the new master is completed.

28. The method according to claim 27, further comprising buffering seizure requests for resources received during migration of the master and, after completion of the transfer, transmitting the buffered seizure requests to the new master.

29. The method according to claim 28, further comprising:
detecting failure of a blade on which the new master is provided before completion of the migration; and
responsive to said detection, aborting the migration of the master.

30. The method according to claim 14, wherein the switching center server further comprise a buddy for the master and a coordinator, and wherein the method further comprises:
detecting failure of the blade on which said buddy is present,
determining at the coordinator to which blade the buddy should be migrated, and creating a new buddy on that blade,
transmitting from the master to the new buddy all data needed by the new buddy,
transmitting from the buddy to other blades information that informs the other blades that the buddy has been migrated to the new buddy, and
sending from the master to the new buddy, after the master has been informed of the transfer, information indicating changed seizure states.

31. The method according to claim 14, wherein the switching center server further comprises a buddy for the master and a coordinator, wherein the coordinator is configured to create at least one of a new master and new buddy when a blade fails, and wherein the method comprises moving said coordinator from a first blade to a second blade without changing the coordinator's control over the creation of said new master or new buddy.

32. The method according to claim 14, wherein the switching center server further comprises buddies for one or more masters, and wherein the method further comprises:
detecting activation of a new blade, and
transmitting from another blade to the new active blade the current status and the allocation of masters and buddies.

* * * * *

UNITED STATES PATENT AND TRADEMARK OFFICE
CERTIFICATE OF CORRECTION

PATENT NO.        : 9,198,111 B2                                    Page 1 of 2
APPLICATION NO.   : 14/146756
DATED             : November 24, 2015
INVENTOR(S)       : Speks et al.

It is certified that error appears in the above-identified patent and that said Letters Patent is hereby corrected as shown below:

In the drawings

In Fig. 5, Sheet 6 of 19, in Box "112b", delete "ROUTE B-MASTER" and insert -- ROUTE-B MASTER --, therefor.

In Fig. 15, Sheet 16 of 19, in Box "112b", delete "ROUTE B-MASTER" and insert -- ROUTE-B MASTER --, therefor.

In Fig. 16, Sheet 17 of 19, in Box "112b", delete "ROUTE B-MASTER" and insert -- ROUTE-B MASTER --, therefor.

In Fig. 17, Sheet 18 of 19, in Box "112b", delete "ROUTE B-MASTER" and insert -- ROUTE-B MASTER --, therefor.

In the specification

In Column 1, Line 7, delete "2011," and insert -- 2011, now Pat. No. 8,654,762, --, therefor.

In Column 2, Line 35, delete "IDSN" and insert -- ISDN --, therefor.

In Column 7, Line 20, delete "buddy and" and insert -- buddy, --, therefor.

In Column 7, Line 21, delete "buddy." and insert -- buddy, --, therefor.

In Column 7, Line 24, delete "retaining." and insert -- retaining, --, therefor.

In Column 7, Line 28, delete "buddies," and insert -- buddies, and --, therefor.

In Column 7, Line 30, delete "recovery," and insert -- recovery. --, therefor.

Signed and Sealed this
Nineteenth Day of April, 2016

Michelle K. Lee
*Director of the United States Patent and Trademark Office*

CERTIFICATE OF CORRECTION (continued)
U.S. Pat. No. 9,198,111 B2

In the specification

In Column 14, Line 14, delete "blade" and insert -- blade. --, therefor.

In Column 14, Line 56, delete "BUDDY READY" and insert -- BUDDY_READY --, therefor.

In the claims

In Column 20, Line 3, in Claim 7, delete "according" and insert -- according to --, therefor.

In Column 20, Line 27, in Claim 11, delete "Digital Service" and insert -- Service Digital --, therefor.

In Column 20, Line 49, in Claim 15, delete "Digital Service" and insert -- Service Digital --, therefor.

In Column 21, Line 1, in Claim 18, delete "comprising" and insert -- comprising: --, therefor.

In Column 22, Line 12, in Claim 27, delete "indicating that that" and insert -- indicating that --, therefor.